(12) United States Patent
Anderson et al.

(10) Patent No.: US 12,052,086 B2
(45) Date of Patent: Jul. 30, 2024

(54) COMBINED DUPLEXER

(71) Applicant: Wilson Electronics, LLC, St. George, UT (US)

(72) Inventors: Dale Robert Anderson, Colleyville, TX (US); Christopher Ken Ashworth, Toquerville, UT (US)

(73) Assignee: Wilson Electronics, LLC

( * ) Notice: Subject to any disclaimer, the term of this patent is extended or adjusted under 35 U.S.C. 154(b) by 253 days.

(21) Appl. No.: 17/600,990

(22) PCT Filed: Mar. 27, 2020

(86) PCT No.: PCT/US2020/025510
§ 371 (c)(1),
(2) Date: Oct. 1, 2021

(87) PCT Pub. No.: WO2020/205653
PCT Pub. Date: Oct. 8, 2020

(65) Prior Publication Data
US 2022/0166492 A1 May 26, 2022

Related U.S. Application Data

(60) Provisional application No. 62/827,700, filed on Apr. 1, 2019.

(51) Int. Cl.
*H04B 7/155* (2006.01)
*H04B 1/00* (2006.01)
*H04B 1/04* (2006.01)

(52) U.S. Cl.
CPC ....... *H04B 7/15528* (2013.01); *H04B 1/0064* (2013.01); *H04B 1/0078* (2013.01); *H04B 1/0483* (2013.01)

(58) Field of Classification Search
CPC .......... H04B 7/15528; H04B 1/0064; H04B 1/0078; H04B 1/0483
See application file for complete search history.

(56) References Cited

U.S. PATENT DOCUMENTS 4,776,032 A  10/1988 Odate et al.
5,303,395 A   4/1994 Dayani
(Continued)

FOREIGN PATENT DOCUMENTS

EP   1525678 B1   7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — David S Huang
(74) *Attorney, Agent, or Firm* — Thorpe North & Western, LLP.

(57) ABSTRACT

Technology for a combined duplexer is disclosed. The combined duplexer can include a first common port and a second common port, a first first direction filter is configured to pass a first direction signal in a first frequency band and, a first second direction filter to pass a second direction signal in a second frequency band, and a second first direction filter to pass the first signal in the first frequency band. The first first direction filter and the first second direction filter share the first common port. The first second direction filter and the second first direction filter share the second common port.

27 Claims, 12 Drawing Sheets

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 9,312,888 B2 * | 4/2016 | Weissman | H04B 7/0404 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2011/0085477 A1 * | 4/2011 | Schiff | H04B 7/15585 370/279 |
| 2011/0151775 A1 | 6/2011 | Kang et al. | |
| 2011/0158081 A1 * | 6/2011 | Wang | H03F 1/3258 370/201 |
| 2014/0266425 A1 * | 9/2014 | Ashworth | H04B 7/15535 330/147 |
| 2015/0087246 A1 | 3/2015 | Khlat | |
| 2016/0028365 A1 | 1/2016 | Takeuchi | |
| 2016/0294350 A1 | 10/2016 | Desclos | |
| 2018/0131501 A1 * | 5/2018 | Little | H04B 1/0064 |

OTHER PUBLICATIONS

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50-8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; (2001); Data Sheet; 218 pages.

* cited by examiner

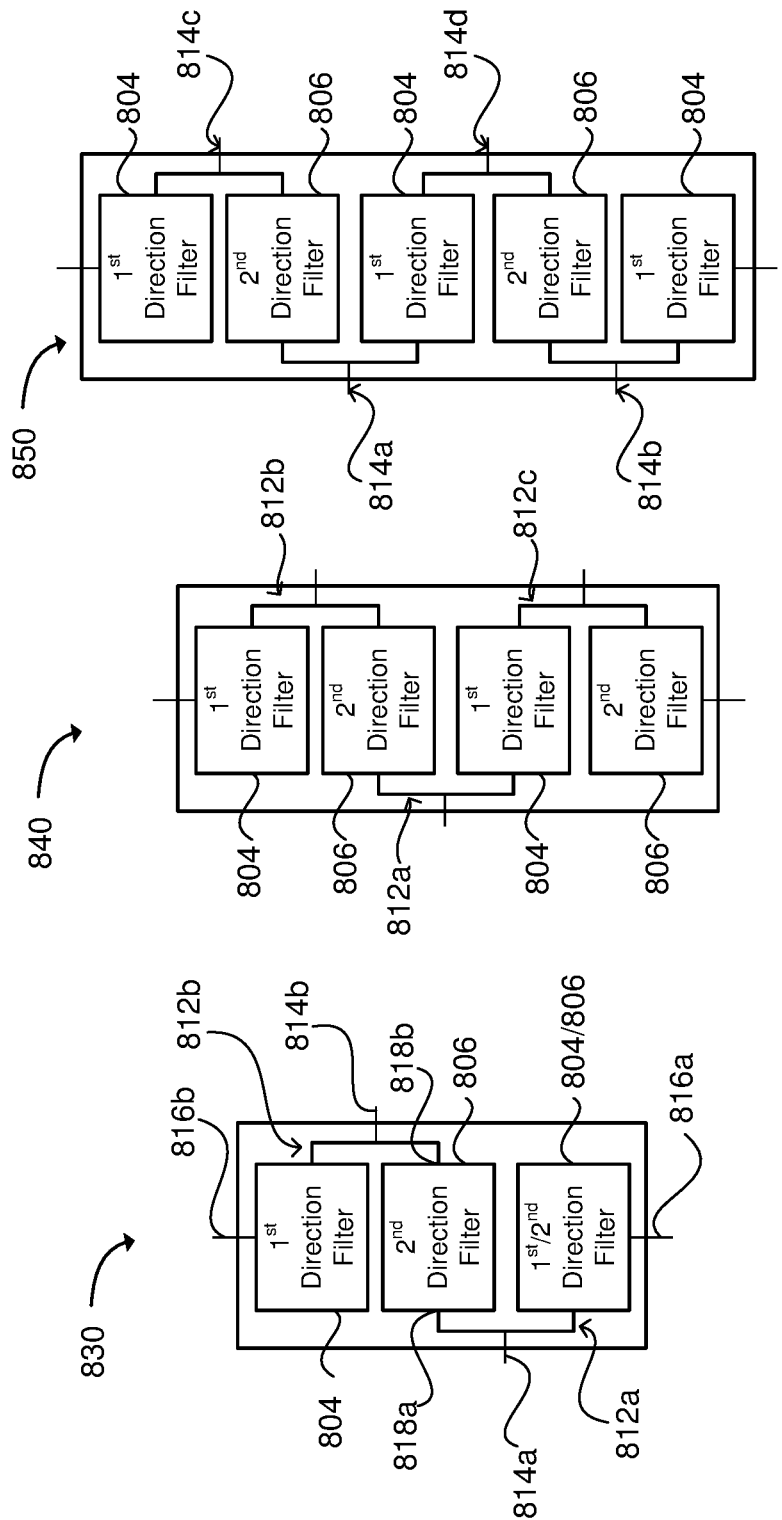

COMBINED DUPLEXER

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 8a illustrates an embodiment of a combined duplexer with three directional filters, in accordance with an example;

FIG. 8b illustrates an embodiment of a combined duplexer with four directional filters, in accordance with an example;

FIG. 8c illustrates an embodiment of a combined duplexer with five directional filters, in accordance with an example;

Figure 1:
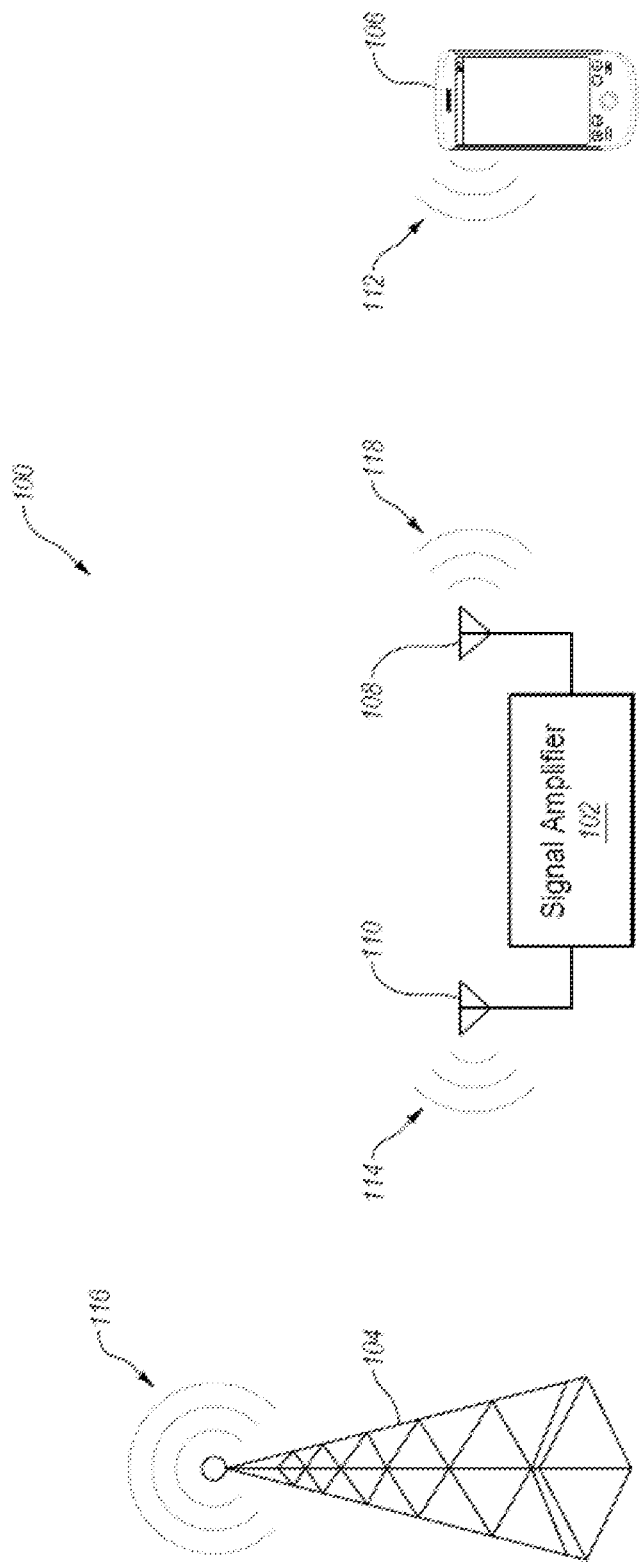
FIG. 1 illustrates a wireless communication system in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

According to some embodiments described herein, a bi-directional signal booster (referred to hereinafter as a "signal booster" or a "repeater") can be configured to apply a gain to both uplink and downlink signals communicated within a wireless communication system. As detailed below, the signal booster may be configured such that both the uplink and downlink signals propagate within a common amplification path of the signal booster. The common amplification path may include one or more common amplifiers that may each receive and apply a gain to both the uplink and downlink signals. In contrast, traditional signal boosters may include a separate uplink amplification path or a downlink application path that apply a gain to uplink signals or downlink signals, respectively, but not both. Configuring the signal booster such that the same amplifiers are used to apply a gain to both the uplink and downlink signals can reduce the number of components used in the signal booster, the size of a printed circuit board (PCB) associated with the signal booster, the number of PCB layers, etc. For example, a number of power amplifiers (PAs) which consume an increased amount of power and dissipate an increased amount of heat can be reduced, thereby saving power and heat for the signal booster.

The term "uplink" refers to communications that are transmitted to the access point from the wireless device. The term "downlink" refers to communications that are transmitted to the wireless device from the access point.

The disclosed embodiments can provide for a booster having an uplink path and a downlink path, each of which can be active paths. The two paths can each have a transmit (Tx) filter and a receive (Rx) filter around a single path diplex point.

In one embodiment, there can be one or more PAs that are configured to have an uplink path and a downlink path, each of which can be active paths. The two paths can each be communicatively coupled to one or more duplexers. Each duplexer can include a common port that is coupled to a Tx filter and a Rx filter around a single path diplex point.

In embodiments described in FIGS. 8a-8d, multiple Tx and Rx filters can be combined in a single package to form a combined duplexer. The combined duplexer can reduce the number of duplexers used in a signal booster or bidirectional amplifier. The reduced number of duplexers can further reduce the cost of components, reduce insertion loss through the signal path, and reduce the noise floor. This will be described more fully in the proceeding paragraphs.

FIG. 1 illustrates an example wireless communication system 100 (referred to hereinafter as "system 100"), arranged in accordance with at least some embodiments described herein. The system 100 may be configured to provide wireless communication services to a wireless device 106 via an access point 104. The system 100 may further include a bi-directional signal booster 102 (i.e. a repeater that is referred to hereinafter as "the signal booster"). The signal booster 102 can be any suitable system, device, or apparatus configured to receive wireless signals communicated between the access point 104 and the wireless device 106. The signal booster 102 can be configured to amplify, repeat, filter, or otherwise process the received wireless signals and can be configured to re-transmit the processed wireless signals. Although not expressly illustrated in FIG. 1, the system 100 can include any number of access points 104 providing wireless communication services to any number of wireless devices 106.

The wireless communication services provided by the system 100 can include voice services, data services, messaging services, and/or any suitable combination thereof. The system 100 can include a Frequency Division Duplexing (FDD) network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, a wireless local network, such as an IEEE 802.11 network, and/or some other wireless communication network. In some embodiments, the system 100 may be configured to operate as a second generation (2G) wireless communication network, a third generation (3G) wireless communication network, a fourth generation (4G) wireless communication network, a fifth generation (5G) wireless network, and/or a Wi-Fi network. In these or other embodiments, the system 100 may be configured to operate as a repeater in a Third Generation Partnership Project (3GPP) wireless communication network.

The access point 104 can be any suitable wireless network communication point and can include, by way of example but not limitation, a base station, a remote radio head (RRH), a satellite, a wireless router, or any other suitable communication point. The wireless device 106 can be any device that is configured to use the system 100 for obtaining wireless communication services and can include, by way of example and not limitation, a cellular phone, a smartphone, a personal data assistant (PDA), a laptop computer, a personal computer, a tablet computer, a wireless communication card, or any other similar device configured to communicate within the system 100.

As signals propagate between the access point 104 and the wireless device 106, the signals may be affected during the propagation such that, in some instances, the wireless signals communicated between the access point 104 and the wireless device 106 may be substantially degraded. The signal degradation may result in the access point 104 or the wireless device 106 not receiving, detecting, or extracting information from the wireless signals. Therefore, the signal booster 102 can be configured to increase the power of and/or improve the signal quality of the wireless signals such that the communication of the wireless signals between the access point 104 and the wireless device 106 can be improved.

In some embodiments, the signal booster 102 can receive a wireless signal communicated between the access point 104 and the wireless device 106 that can be converted into an electrical signal (e.g., via an antenna). The signal booster 102 can be configured to amplify the electrical signal and the amplified electrical signal can be converted into an amplified wireless signal that is transmitted (via an antenna). The signal booster 102 can amplify the electrical signal by applying a gain to the electrical signal. The gain may be a set gain or a variable gain, and may be less than, equal to, or greater than one. Therefore, in the present disclosure, the term "amplify" can refer to applying any gain to a wireless signal even if the gain is less than one.

In some embodiments, the signal booster 102 can adjust the gain based on conditions associated with communicating the wireless signals (e.g., providing noise floor, oscillation, and/or overload protection). In these and other embodiments, the signal booster 102 can adjust the gain in real time. The signal booster 102 can also filter out noise associated with the received wireless signal such that the retransmitted wireless signal may be a cleaner signal than the received wireless signal. Therefore, the signal booster 102 may improve the communication of wireless signals between the access point 104 and the wireless device 106.

For example, the wireless device 106 can communicate a wireless uplink signal 112 intended for reception by the access point 104 and a first antenna 108 can be configured to receive the wireless uplink signal. The first antenna 108 can be configured to convert the received wireless uplink signal 112 into an electrical uplink signal. Additionally, the first antenna 108 can be communicatively coupled to a first interface port (not expressly depicted in FIG. 1) of the signal booster 102 such that the signal booster 102 can receive the electrical uplink signal 112 at the first interface port. An interface port can be any suitable port configured to interface the signal booster 102 with another device (e.g., an antenna or a modem) from which the signal booster 102 may receive a signal and/or to which the signal booster 102 may communicate a signal.

In some embodiments, the signal booster 102 can be configured to apply a gain to the electrical uplink signal to amplify the electrical uplink signal. In the illustrated embodiment, the signal booster 102 can direct the amplified electrical uplink signal toward a second interface port (not expressly depicted in FIG. 1) of the signal booster 102 that may be communicatively coupled to a second antenna 110. The second antenna 110 can be configured to receive the amplified electrical uplink signal from the second interface port and can convert the amplified electrical uplink signal into an amplified wireless uplink signal 114 that can also be transmitted by the second antenna 110. The amplified wireless uplink signal 114 can be received by the access point 104.

In some embodiments, the signal booster 102 can also be configured to filter the electrical uplink signal to remove at least some noise associated with the received wireless uplink signal 112. Consequently, the amplified wireless uplink signal 114 can have a better signal to noise ratio (SNR) than the wireless uplink signal 112 that is received by the first antenna 108. Accordingly, the signal booster 102 can be configured to improve the communication of uplink signals between the access point 104 and the wireless device 106. The use of the term "uplink signal" without specifying wireless or electrical uplink signals can refer to wireless uplink signals or electrical uplink signals.

As another example, the access point 104 can communicate a wireless downlink signal 116 intended for the wireless device 106 and the second antenna 110 can be configured to receive the wireless downlink signal 116. The second antenna 110 can convert the received wireless downlink signal 116 into an electrical downlink signal such that the electrical downlink signal can be received at the second interface port of the signal booster 102. In some embodiments, the signal booster 102 can be configured to apply a gain to the electrical downlink signal to amplify the electrical downlink signal. The signal booster 102 can also be configured to direct the amplified electrical downlink signal toward the first interface port of the signal booster 102 such that the first antenna 108 can receive the amplified electrical downlink signal. The first antenna 108 can be configured to convert the amplified electrical downlink signal into an amplified wireless downlink signal 118 that can also be transmitted by the first antenna 108. Accordingly, the amplified wireless downlink signal 118 can be received by the wireless device 106.

In some embodiments, the signal booster 102 can also be configured to filter the electrical downlink signal to remove at least some noise associated with the received wireless downlink signal 116. Therefore, the amplified wireless downlink signal 118 can have a better SNR than the wireless downlink signal 116 received by the second antenna 110. Accordingly, the signal booster 102 can also be configured to improve the communication of downlink signals between the access point 104 and the wireless device 106. The use of the term "downlink signal" without specifying wireless or electrical downlink signals may refer to wireless downlink signals or electrical downlink signals.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can enhance the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15 or 16, 3GPP 5G Release 15 or 16, or Institute of Electronics and Electrical Engineers (IEEE) 802.16. In one configuration, the signal booster 120 can boost signals for 3GPP LTE Release 16.0.0 (January 2019) or other desired releases. The signal booster 120 can boost signals from the 3GPP Technical Specification (TS) 36.101 (Release 16 Jul. 2019) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-85 or other bands, as disclosed in 3GPP TS 36.104 V16.0.0 (January 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD6 |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

NOTE 1:
Band 6, 23 are not applicable.
NOTE 2:
Restricted to E-UTRA operation when carrier aggregation is configured. The downlink operating band is paired with the uplink operating band (external) of the carrier aggregation configuration that is supporting the configured Pcell.
NOTE 3:
This band is an unlicensed band restricted to licensed-assisted operation using Frame Structure Type 3.
NOTE 4:
Band 46 is divided into four sub-bands as in Table 5.5-1A.
NOTE 5:
The range 2180-2200 MHz of the DL operating band is restricted to E-UTRA operation when carrier aggregation is configured.
NOTE 6
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7:
Void
NOTE 8:
This band is restricted to licensed-assisted operation using Frame Structure Type 3.

In another configuration, the signal booster 120 can boost signals from the 3GPP Technical Specification (TS) 38.104 (Release 16 Jul. 2019) bands or 5G frequency bands. In addition, the signal booster 120 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.0.0 (July 2019), and depicted in Table 2 and Table 3:

TABLE 2

| NR operating band | Uplink (UL) operating band BS receive/UE transmit $F_{UL,low}-F_{UL,high}$ | Downlink (DL) operating band BS transmit/UE receive $F_{DL,low}-F_{DL,high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL,low}-F_{UL,high}$ $F_{DL,low}-F_{DL,high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

The number of LTE or 5G frequency bands and the level of signal enhancement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

Modifications can be made to the system 100 without departing from the scope of the present disclosure. For example, in some embodiments, the distance between the signal booster 102 and the wireless device 106 may be relatively close as compared to the distance between the signal booster 102 and the access point 104. Further, the system 100 can include any number of signal boosters 102, access points 104, and/or wireless devices 106. Additionally, in some embodiments the signal booster 102 can be integrated with the wireless device 106, and in other embodiments, the signal booster 102 can be separate from the wireless device 106. Also, in some embodiments, the signal booster 102 can be included in a cradle configured to hold the wireless device 106. Additionally, in some embodiments, the signal booster 102 can be configured to communicate with the wireless device 106 via wired communications (e.g., using electrical signals communicated over a wire) instead of wireless communications (e.g., via wireless signals).

Further, in some embodiments, the signal booster 102 can be configured such that the uplink signals and downlink signals are amplified within a common amplification path. The common amplification path can include one or more common amplifiers configured such that each common amplifier can apply a gain to both the uplink signals and the downlink signals. The common amplification path can accordingly reduce the number of components within the signal booster 102, which can reduce a cost associated with the signal booster 102.

Additionally, although the signal booster 102 is illustrated and described with respect to receiving and transmitting signals via the first antenna 108 and the second antenna 110, the scope of the present disclosure is not limited to such applications. For example, in some embodiments, the signal booster 102 (or other signal boosters described herein) may receive and/or transmit signals via one or more modems.

Figure 2:
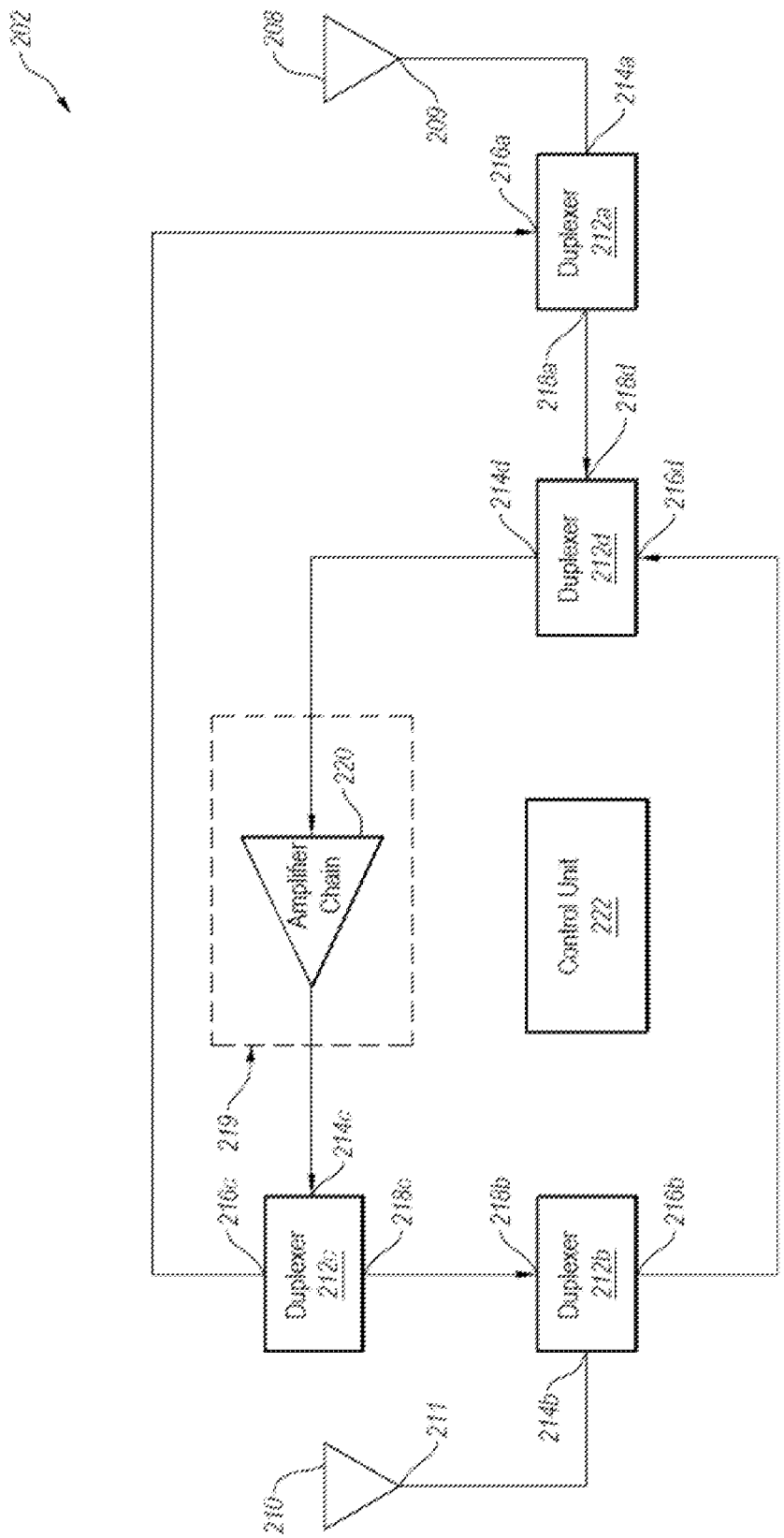
FIG. 2 illustrate embodiments of a bi-directional signal booster with a common amplification path in accordance with an example.

FIG. 2 illustrates an example embodiment of a bi-directional signal booster 202 (referred to hereinafter as "the signal booster 202") with a common amplification path 219, arranged in accordance with at least some embodiments described herein. In some embodiments, the signal booster 202 can be configured to operate in a manner analogous to the operation of the signal booster 102 of the system 100 of FIG. 1. The signal booster 202 can include a first interface port 209 communicatively coupled to a first antenna 208, a second interface port 211 communicatively coupled to a second antenna 210, with the common amplification path 219 communicatively coupled between the first interface port 209 and the second interface port 211.

The signal booster 202 can be configured such that uplink signals that are received at the first interface port 209 from the first antenna 208 can be directed toward the common amplification path 219. The signal booster 202 can also be configured such that the uplink signals can be directed from the common amplification path 219 toward the second interface port 211 and the second antenna 210. Additionally, the signal booster 202 can also be configured such that downlink signals that are received at the second interface port 211 from the second antenna 210 can be directed toward the common amplification path 219. The signal booster 202 can also be configured to direct the downlink signals from the common amplification path 219 toward the first interface port 209 and the first antenna 208. Accordingly, the signal booster 202 can be configured such that the common amplification path 219 can receive and amplify both the downlink signals and the uplink signals.

In some embodiments, the signal booster 202 can also include duplexers 212a-212d that can be configured to direct the uplink signals from the first interface port 209 toward the common amplification path 219 and from the common amplification path 219 toward the second interface port 211. The duplexers 212a-212d can also be configured to direct the downlink signals from the second interface port 211 toward the common amplification path 219 and from the common amplification path 219 toward the first interface port 209.

The duplexer 212a can include a common port 214a, a downlink port 216a and an uplink port 218a. The duplexer 212b can include a common port 214b, a downlink port 216b and an uplink port 218b. The duplexer 212c can include a common port 214c, a downlink port 216c and an uplink port 218c, and the duplexer 212d can include a common port 214d, a downlink port 216d and an uplink port 218d. Each duplexer 212 can be configured such that downlink signals received at their respective common ports 214 are directed out of their respective downlink ports 216 and such that uplink signals received at their respective common ports 214 are directed out of their respective uplink ports 218. Additionally, each duplexer 212 can be configured such that downlink signals received at their respective downlink ports 216 can be directed out of their respective common ports 214 and such that uplink signals received at their respective uplink ports 218 can be directed out of their respective common ports 214.

In some embodiments, the duplexers 212a-212d can be configured to direct the uplink and downlink signals using filters configured based on frequency ranges associated with the uplink and downlink signals. For example, a particular duplexer 212 can include an uplink filter communicatively coupled between its common port 214 and its uplink port 218. The uplink filter can be configured to filter signals based on uplink signal frequencies such that frequencies within the uplink signal frequencies can pass through the uplink filter and frequencies outside of the uplink signal frequencies may be filtered out by the uplink filter. The particular duplexer 212 can also include a downlink filter communicatively coupled between its common port 214 and its downlink port 216. Each downlink filter can be configured to filter signals based on downlink signal frequencies such that frequencies within the downlink signal frequencies can pass through the downlink filter and frequencies outside of the downlink signal frequencies can be filtered out by the downlink filter.

Therefore, in some embodiments, one or more of the duplexers 212a-212d can be replaced with a set of filters (e.g., band pass filters), where one of the filters may be configured based on uplink signal frequencies and the other filter can be configured based on downlink signal frequencies. Further, in some embodiments, a signal splitter/combiner that may not provide filtering can be used as one or more of the duplexers 212a-212d. Additionally, in some embodiments, a component that can direct signals in a certain direction (e.g., a circulator) can be used as the duplexer 212a and/or the duplexer 212b.

With respect to uplink signals, in the illustrated embodiment, the common port 214a of the duplexer 212a can be communicatively coupled to the first interface port 209 such that the common port 214a can receive uplink signals that can be received by the first interface port 209 via the first antenna 208. The duplexer 212a can direct the uplink signals received at the common port 214a to be output at the uplink port 218a of the duplexer 212a, which can be communicatively coupled to the uplink port 218d of the duplexer 212d. The duplexer 212d can be configured to direct the uplink signals received at the uplink port 218d to be output at the common port 214d. The common port 214d can be communicatively coupled to the common amplification path 219 such that the duplexer 212d may direct the uplink signals toward the common amplification path 219. Therefore, the duplexer 212a and the duplexer 212d can be configured to direct the uplink signals from the first interface port 209 toward the common amplification path 219.

With respect to downlink signals, in the illustrated embodiment, the common port 214b of the duplexer 212b can be communicatively coupled to the second interface port 211 such that the common port 214b can receive downlink signals that can be received by the second interface port 211 via the second antenna 210. The duplexer 212b can direct the downlink signals received at the common port 214b to be output at the downlink port 216b of the duplexer 212b, which can be communicatively coupled to the downlink port 216d of the duplexer 212d. The duplexer 212d can be configured to direct the downlink signals received at the downlink port 216d to be output at the common port 214d. As mentioned above, the common port 214d can be communicatively coupled to the common amplification path 219 such that the duplexer 212d can direct the downlink signals toward the common amplification path 219. Therefore, the duplexer 212b and the duplexer 212d can be configured to direct the downlink signals from the second interface port 211 toward the common amplification path 219.

The common amplification path 219 can include one or more common amplifier chains, such as a common amplifier chain 220. The common amplifier chain 220 can include one or more common amplifiers configured to apply a gain to signals received by the common amplifier chain 220. In the illustrated embodiment, the common amplifier chain 220 can be communicatively coupled to the common port 214d of the duplexer 212d. Therefore, the common amplifier chain 220 can be configured to receive both uplink and downlink signals such that the common amplifier chain 220 can apply a gain to both the downlink signals and the uplink signals that can be output by the duplexer 212d. As mentioned above, the gain can be a set gain or a variable gain and can be less than, equal to, or greater than one. In some embodiments the gain of the common amplifier chain 220 can be adjusted by a control unit 222 communicatively coupled to the common amplifier chain 220. In some embodiments the control unit 222 can adjust the gain of the common amplifier chain 220 based on wireless communication conditions.

If included in the signal booster 202, the control unit 222 can be implemented by any suitable mechanism, such as a program, software, function, library, software as a service, analog or digital circuitry, or any combination thereof. The control unit 222 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the common amplifier chain 220. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

The common amplifier chain 220 can be communicatively coupled to the common port 214c of the duplexer 212c such that the common port 214c can receive both the uplink signals and the downlink signals output by the common amplifier chain 220. The duplexer 212c can be configured to direct the downlink signals from the common port 214c toward the downlink port 216c and direct the uplink signals from the common port 214c toward the uplink port 218c. The downlink port 216c of the duplexer 212c can be communicatively coupled to the downlink port 216a of the duplexer 212a such that the duplexer 212c can be configured to direct the downlink signals toward the downlink port 216a of the duplexer 212a. Similarly, the uplink port 218c of the duplexer 212c can be communicatively coupled to the uplink port 218b of the duplexer 212b such that the duplexer 212c can be configured to direct the uplink signals toward the uplink port 218b of the duplexer 212b.

The duplexer 212a can direct the downlink signals from the downlink port 216a toward the common port 214a such that the downlink signals can be communicated from the common port 214a toward the first antenna 208 via the first interface port 209. The duplexer 212b can direct the uplink signals from the uplink port 218b toward the common port 214b such that the uplink signals can be communicated from the common port 214b toward the second antenna 210 via the second interface port 211.

Therefore, the duplexers 212a-212d of the signal booster 202 can be configured to direct uplink signals received at the first interface port 209 toward the common amplification path 219 and from the common amplification path 219 toward the second interface port 211. Additionally, the duplexers 212a-212d can be configured to direct downlink signals received at the second interface port 211 toward the common amplification path 219 and from the common amplification path 219 toward the first interface port 209. Therefore, the signal booster 202 can be configured such that both downlink signals and uplink signals can pass through and be amplified by one or more common amplifier chains 220 of the common amplification path 219, which can reduce the number of components within the signal booster 202.

Modifications, additions, or omissions can be made to the signal booster 202 without departing from the scope of the present disclosure. For example, one or more amplifier chains can be included between the duplexers 212a and 212d and/or the duplexers 212b and 212d such that the uplink and/or downlink signals can be individually amplified before reaching the common amplification path 219. Further, in these or other embodiments, one or more amplifier chains can be included between the duplexers 212c and 212a and/or between the duplexers 212c and 212b such that the downlink and uplink signals can be individually amplified after leaving the common application path 219 but before being transmitted by the second antenna 210 and the first antenna 208, respectively. Therefore, in some embodiments, the signal booster 202 can be configured such that the gain applied to the uplink and downlink signals can be different.

Additionally, in some embodiments, the signal booster 202 can include more than one common amplification path where each common amplification path can be configured to apply a gain to uplink and downlink signals associated with a particular wireless communication band. For example, the signal booster 202 can include a common amplification path for each of one or more bands of a 700 Megahertz (MHz) band plan for commercial services of the Third Generation Partnership Project (3GPP) (the "700 MHz band plan").

Figure 3:
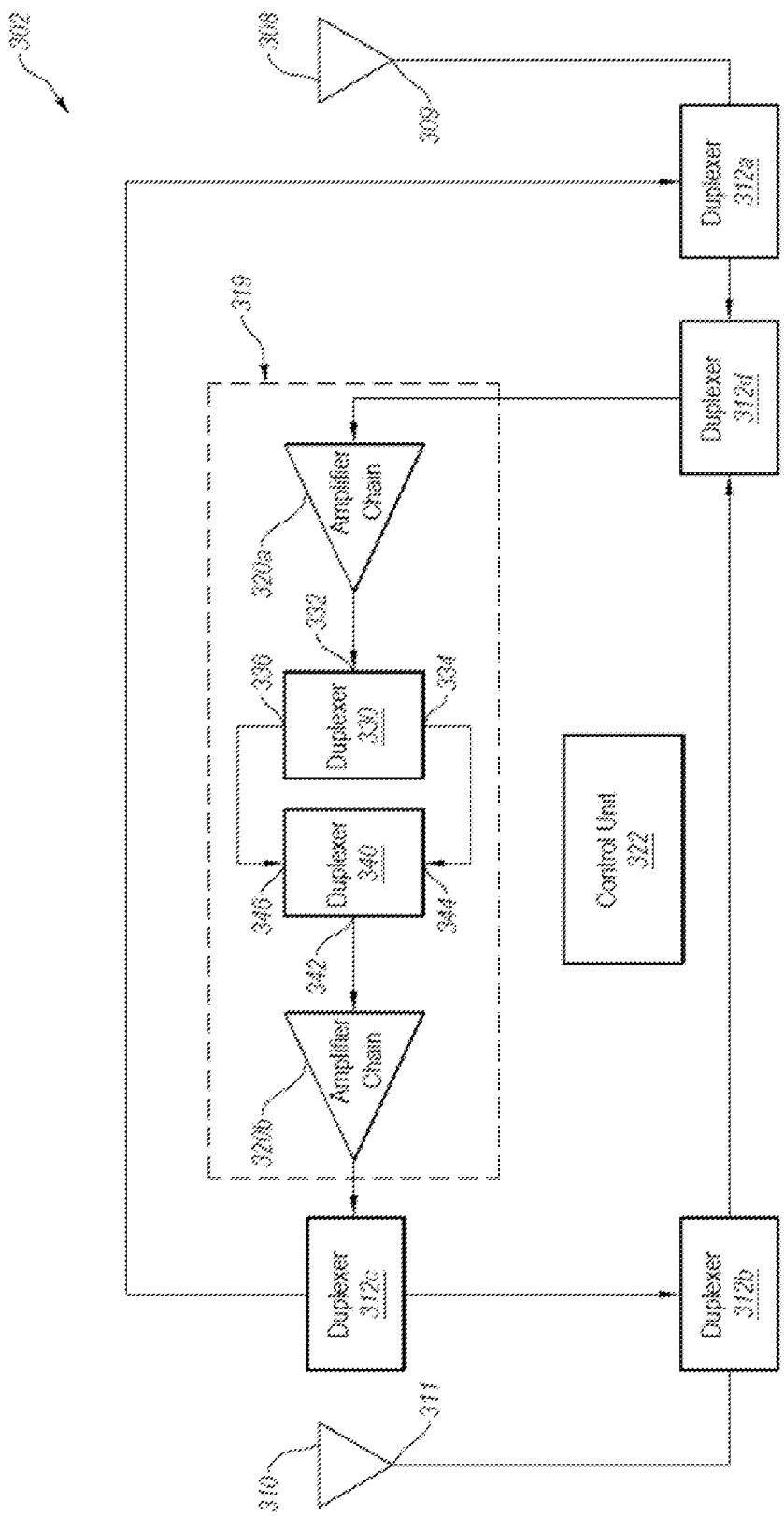
FIG. 3 illustrate embodiments of a bi-directional signal booster with a common amplification path in accordance with an example.

Also, in some embodiments, the common amplification path 219 can include additional amplifier chains than that expressly depicted and/or can include one or more filtering schemes configured to filter the uplink and/or downlink signals. The filtering can be performed to reduce noise in the uplink and downlink signals and/or to provide improved isolation between the uplink and downlink signals. FIG. 3 below depicts an example embodiment of a signal booster with a common amplification path configured to filter the downlink and uplink signals.

Figure 4:
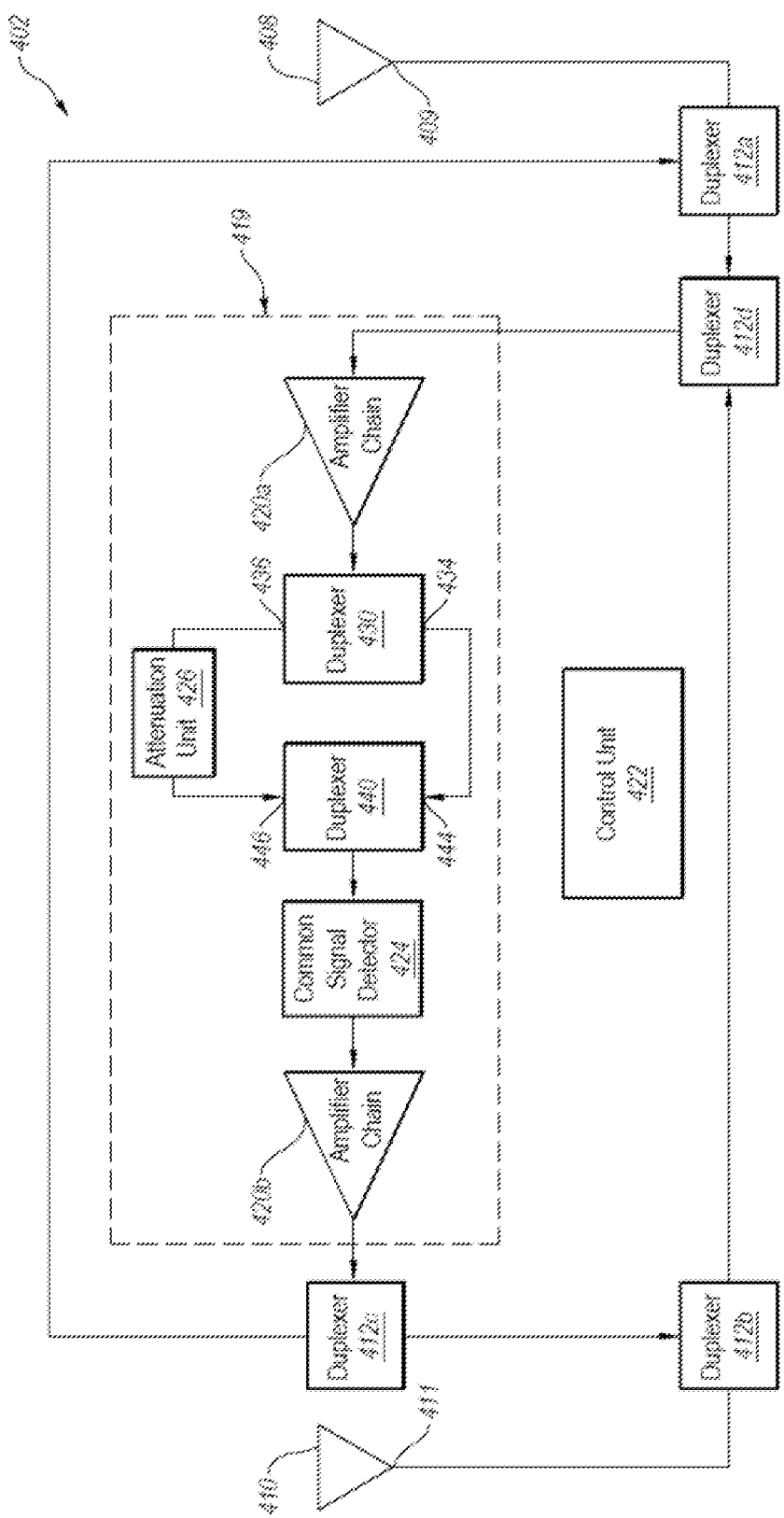
FIG. 4 illustrates an embodiment of a bi-directional signal booster with a common amplification path and a common signal detector in accordance with an example.

Further, the common amplification path 219 can include other components than those expressly depicted, such as one or more attenuators (variable and/or set) that can be configured to attenuate the downlink and/or uplink signals by applying a gain of less than one to the uplink and downlink signals. In some embodiments, the additional components can be included between the components expressly depicted in the figures. As such, the use of the terms "from," "to," and "toward" with respect to signals propagating between specific components can include embodiments where intermediate components can be included between the specific components. Further, in these and other embodiments, the common amplification path 219 can include a common signal detector (e.g., a radio frequency (RF) sensor) configured to receive both the uplink and downlink signals and configured such that it can detect a power level of both the uplink and downlink signals. FIG. 4 depicts an example embodiment where a common signal detector can be used to detect the power levels of both the uplink and downlink signals.

Additionally, although the above embodiment is described with respect to a signal booster, the above described configuration of directing opposite direction signals (e.g., uplink and downlink signals) to and from a common amplification path can be used with respect to any suitable bi-directional amplifier. Accordingly, the scope of the present disclosure is not limited to signal boosters.

FIG. 3 illustrates an example embodiment of a bi-directional signal booster 302 (referred to hereinafter as "the signal booster 302") with a common amplification path 319, arranged in accordance with at least some embodiments described herein. In some embodiments, the signal booster 302 can be configured to operate in a manner analogous to the operation of the signal booster 102 of the system 100 of FIG. 1. The signal booster 302 can include a first interface port 309 communicatively coupled to a first antenna 308, a second interface port 311 communicatively coupled to a second antenna 310, with the common amplification path 319 communicatively coupled between the first interface port 309 and the second interface port 311.

Similar to the signal booster 202 of FIG. 2, the signal booster 302 can be configured such that uplink signals received at the first interface port 309 from the first antenna 308 can be directed toward the common amplification path 319. The signal booster 302 can be configured such that downlink signals received at the second interface port 311 from the second antenna 310 can also be directed toward the common amplification path 319. The common amplification path 319 can accordingly be configured to amplify both the uplink and downlink signals.

The signal booster 302 can additionally be configured to direct the uplink signals from the common amplification path 319 toward the second interface port 311 and the second antenna 310. The signal booster 302 can also be configured to direct the downlink signals from the common amplification path 319 toward the first interface port 309 and the first antenna 308. In the illustrated embodiment of FIG. 3, the signal booster 302 can include duplexers 312a-312d configured in a manner analogous to that of the duplexers 212a-212d of the signal booster 202 of FIG. 2. The duplexers 312a-312d can accordingly be configured to direct the uplink and downlink signals in a manner analogous to how the duplexers 212a-212d direct uplink and downlink signals in the signal booster 202 of FIG. 2.

In the illustrated embodiment, the common amplification path 319 can include a common amplifier chain 320a and a common amplifier chain 320b. The common amplifier chains 320a and 320b can each be configured to apply a gain to the uplink and downlink signals that can propagate through the common amplification path 319, similar to the common amplifier chain 220 of FIG. 2. In some embodiments, the common amplifier chain 320a and/or the common amplifier chain 320b can be configured to apply the gain based on instructions received from a control unit 322 of the signal booster 302 that can be analogous to the control unit 222 of the signal booster 202 of FIG. 2.

In some embodiments, the common amplification path 319 can include a splitting duplexer 330 and a combining duplexer 340 that can be configured to filter the uplink and downlink signals that can propagate through the common amplification path 319. As described in further detail below, the splitting duplexer 330 can be configured to separate (i.e., split) the uplink signals within the common amplification path 319 from the downlink signals within the common amplification path. Additionally, as described in further detail below, the combining duplexer 340 can be configured to recombine the uplink and downlink signals after they have been separated by the splitting duplexer 330.

In the illustrated embodiment, the splitting duplexer 330 can include a common port 332 communicatively coupled to an output of the common amplifier chain 320a such that the common port 332 can receive the uplink and downlink signals that have been amplified by the common amplifier chain 320a. In some embodiments, the splitting duplexer 330 can be configured to filter uplink signals received at the common port 332 based on an uplink frequency range associated with the uplink signals such that the uplink signals and their associated uplink frequencies can pass through the filtering and can be output at a first uplink port 336 of the splitting duplexer 330. Additionally, frequencies outside of the uplink frequency range (e.g., noise, downlink frequencies, etc.) can be filtered out and are not output at the first uplink port 336. The splitting duplexer 330 can also be configured to filter downlink signals received at the common port 332 based on a downlink frequency range associated with the downlink signals such that the downlink signals and their associated downlink frequencies can pass through the filtering and can be output at a first downlink port 334 of the splitting duplexer 330. Additionally, frequencies outside of the downlink frequency range (e.g., noise, uplink frequencies, etc.) can be filtered out and are not output at the first downlink port 334.

The first downlink port 334 of the splitting duplexer 330 can be communicatively coupled to a second downlink port 344 of the combining duplexer 340 and the first uplink port 336 of the splitting duplexer 330 can be communicatively coupled to a second uplink port 346 of the combining duplexer 340. In some embodiments, the combining duplexer 340 can be configured to filter the uplink signals received at the second uplink port 346 based on the frequency range associated with the uplink signals in a manner similar to the splitting duplexer 330. In some embodiments, the combining duplexer 340 can also be configured to filter the downlink signals received at the second downlink port 344 based on the frequency range associated with the downlink signals in a manner similar to the splitting duplexer 330. The combining duplexer 340 can also be configured to output the filtered uplink and downlink signals at the common port 342 of the combining duplexer 340. In the illustrated embodiment, the common port 342 of the combining duplexer 340 can be communicatively coupled to the common amplifier chain 320b such that the common amplifier chain 320b can receive both the uplink and downlink signals output at the common port 342 and can apply a gain to both the uplink and downlink signals.

In some embodiments, the common amplification path 319 can include a downlink gain block (not expressly depicted in FIG. 3) communicatively coupled between the first and second downlink ports 334, 344 of the duplexers 330 and 340, respectively. The downlink gain block can accordingly be configured to receive and apply and/or adjust a gain to the downlink signals but not the uplink signals. In some embodiments, the downlink gain block can be configured to apply and/or adjust the gain in response to instructions received from the control unit 322. The downlink gain block can be any suitable system, apparatus, or device configured to apply a gain to the downlink signals received by the downlink gain block. For example, the downlink gain block can include an amplifier chain and/or an attenuator.

In these or other embodiments, the common amplification path 319 can include an uplink gain block (not expressly depicted in FIG. 3) communicatively coupled between the first and second uplink ports 336, 346 of the duplexers 330 and 340. The uplink gain block can be configured to receive and apply and/or adjust a gain to the uplink signals but not the downlink signals. In some embodiments, the uplink gain block can be configured to apply the gain in response to instructions received from the control unit 322. The uplink gain block can be any suitable system, apparatus, or device configured to apply a gain to the uplink signals received by the uplink gain block. For example, the uplink gain block can include an amplifier chain and/or an attenuator.

Therefore, the common amplification path 319 can also be configured to filter the uplink and downlink signals that can propagate through the common amplification path 319. The filtering can improve signal quality, increase isolation between the uplink and downlink signals, and/or allow for greater amplification of the downlink and/or uplink signals. Additionally, through the placement of one or more uplink gain blocks and/or one or more downlink gain blocks, the common amplification path 319 can be configured to apply different gains to the uplink and downlink signals.

Modifications, additions, or omissions can be made to the signal booster 302 without departing from the scope of the present disclosure. For example, the location of the splitting duplexer 330 and the combining duplexer 340 within the common amplification path 319 with respect to the common amplifier chains 320a and 320b, as well as with respect to other amplifier chains not expressly depicted, can vary without departing from the scope of the present disclosure.

Also, in some embodiments, the splitting duplexer 330 or the combining duplexer 340 can be replaced with a signal splitter/combiner that may not perform any filtering as described, but can instead split or combine the uplink and downlink signals in the manner described. For example, in some embodiments, the splitting duplexer 330 can be replaced with a signal splitter that may not perform any filtering and that can direct both downlink and uplink signals toward the second uplink port 346 and the second downlink port 344 of the combining duplexer 340. The combining duplexer can accordingly filter out the downlink signals received at the second uplink port 346 and filter out the uplink signals received at the second downlink port 344, such that filtered downlink and uplink signals are output at the common port 342. In other embodiments, the combining duplexer 340 can be replaced with a signal splitter/combiner configured to receive the uplink and downlink signals from the splitting duplexer 330 and can output the uplink and downlink signals at the common port 342 without providing additional filtering.

Additionally, in some embodiments, one or more of the duplexers 312a-312d can be replaced with a signal splitter/combiner. Further, as mentioned above, in some embodiments, one or more the duplexers of FIG. 3 can be replaced with a set of filters (e.g., band pass filters), where for each replaced duplexer one of the filters can be configured based on uplink signal frequencies in the other filter can be configured based on downlink signal frequencies.

Moreover, one or more amplifier chains can be included between the duplexers 312a and 312d and/or the duplexers 312b and 312d such that the uplink and/or downlink signals can be individually amplified before reaching the common amplification path 319. Further, in these or other embodiments, one or more amplifier chains can be included between the duplexers 312c and 312a and/or between the duplexers 312c and 312b such that the downlink and uplink signals can be individually amplified after leaving the common application path 319 but before being transmitted by the second antenna 310 and the first antenna 308, respectively. Therefore, the signal booster 302 can be configured such that the gain of the uplink and downlink signals can be adjusted individually.

Further, in some embodiments, the signal booster 302 can include more than one common amplification path where each common amplification path can be configured to apply a gain to uplink and downlink signals associated with a particular wireless communication band, such as a band of the 700 MHz band plan. Also, in some embodiments, the common amplification path 319 can include additional amplifier chains than those expressly depicted.

FIG. 4 illustrates an example embodiment of a bi-directional signal booster 402 (referred to hereinafter as "the signal booster 402") with a common amplification path 419, arranged in accordance with the least some embodiments described herein. In some embodiments, the signal booster 402 can be configured to operate in a manner analogous to the operation of a signal booster 102 of the system 100 of FIG. 1. Similar to the signal booster 202 of FIG. 2, the signal booster 402 can include a first interface port 409 communicatively coupled to a first antenna 408, a second interface port 411 communicatively coupled to a second antenna 410, with the common amplification path 419 communicatively coupled between the first interface port 409 and the second interface port 411.

Analogous to the signal booster 202 of FIG. 2, the signal booster 402 can be configured such that uplink signals received at the first interface port 409 from the first antenna 408 can be directed toward the common amplification path 419. The signal booster 402 can additionally be configured such that downlink signals received at the second interface port 411 from the second antenna 410 can also be directed toward the common amplification path 419. The common amplification path 419 can accordingly be configured to receive and amplify both the uplink and downlink signals.

The signal booster 402 can be configured to direct the uplink signals from the common amplification path 419 toward the second interface port 411 and the second antenna 410. The signal booster 402 can also be configured to direct the downlink signals from the common amplification path 419 toward the first interface port 409 and the first antenna 408. In the illustrated embodiment of FIG. 4, the signal booster 402 can include duplexers 412a-412d configured in a manner analogous to that of the duplexers 212a-212d of the signal booster 202 of FIG. 2. The duplexers 412a-412d can accordingly be configured to direct the uplink and downlink signals in a manner analogous to how the duplexers 212a-212d direct uplink and downlink signals in the signal booster 202 of FIG. 2.

In the illustrated embodiment of FIG. 4, the common amplification path 419 can include a common amplifier chain 420a and a common amplifier chain 420b that can be analogous to the common amplifier chains 320a and 320b, respectively, of FIG. 3. Therefore, the common amplifier chains 420a and 420b can be configured to amplify and filter the uplink and downlink signals that can propagate through the common amplification path 419 in a manner analogous to that of the common amplifier chains 320a and 320b of the common amplification path 310 of FIG. 3. In some embodiments, the common amplifier chains 420a and 420b can be configured to amplify the uplink and downlink signals based on instructions received from a control unit 422 of the signal booster 402 that can be analogous to the control unit 222 of the signal booster 202 of FIG. 2. Additionally, the common amplification path 419 can include a splitting duplexer 430 and a combining duplexer 440 that can be analogous to splitting duplexer 330 and the combining duplexer 340, respectively, of the common amplification path 319 of FIG. 3.

In some embodiments, the common amplification path 419 can include a common signal detector 424 configured to receive both the uplink and downlink signals that can propagate through the common amplification path 419. The common signal detector 424 can be any suitable system, apparatus, or device configured to detect a power level of signals that it can receive. For example, in some embodiments, the common signal detector 424 can be an RF sensor that can include a signal rectifier (e.g., a diode) and a resistor that can have a variable output voltage based on the power of received signals. As such, the common signal detector 424 can be configured to detect power levels of both the uplink and downlink signals that can propagate through the common amplification path 419. In traditional embodiments, a signal booster can include an uplink signal detector configured to detect the power level of uplink signals and a downlink signal detector configured to detect the power level of downlink signals, but not a signal detector configured to detect the power level of both downlink and uplink signals. Therefore, including the common signal detector 424 in the common amplification path 419 can reduce the number of components that can be used in the signal booster 402.

In some embodiments, the common signal detector 424 can be communicatively coupled to the control unit 422 such that the control unit 422 can determine the power levels of the uplink and downlink signals that can be detected by the common signal detector 424. In the illustrated embodiment, the control unit 422 can be configured to differentiate between the uplink and downlink signals using an attenuation unit 426 that can also be communicatively coupled to the control unit 422 and communicatively coupled between an uplink port 436 of the splitting duplexer 430 and an uplink port 446 of the combining duplexer 440.

In the illustrated embodiment, the signal booster 402 can be configured for instances when the uplink signals received by the signal booster 402 can have a power level that is substantially larger than the power level of the downlink signals received by the signal booster 402 (e.g., when the signal booster 402 is significantly closer to a wireless device than a wireless communication access point). Therefore, to determine a power level of the downlink signals, the control unit 422 can direct the attenuation unit 426 to attenuate the uplink signals that can pass through the attenuation unit 426 such that the downlink signals received by the common signal detector 424 can be substantially stronger than the uplink signals received by the common signal detector 424. As such, the control unit 422 can determine that the power detected by the common signal detector 424 can be associated with the downlink signals when the uplink signal is being attenuated by the attenuating unit 426.

To determine a power level of the uplink signals, the control unit 422 can direct the attenuation unit 426 to cease or substantially reduce the attenuation of the uplink signals. In the illustrated embodiment, because the received uplink signals can be much stronger than the downlink signals, the downlink power levels that can be included in the power detected by the common signal detector 424 can be substantially negligible compared to the uplink power levels when the attenuation of the uplink signals is ceased or substantially reduced. Therefore, the control unit 422 can be configured to determine that the power levels detected by the signal detector 424 can be substantially associated with the uplink signals when the attenuation of the uplink signals is ceased or substantially reduced.

The attenuation unit 426 can be any suitable system, apparatus, or device that can be configured to attenuate the uplink signals (or downlink signals) that can be received by the common signal detector 424. For example, in some embodiments the attenuation unit 426 can be a variable attenuator that can attenuate uplink signals (or downlink signals) that can pass through the attenuation unit 426 in response to instructions received from the control unit 422. In some embodiments, the attenuation unit 426 can be a switch that can be opened and closed in response to instructions received from the control unit 422. Therefore, when the switch is opened, the uplink signals (or downlink signals) cannot pass to the combining duplexer 446 such that uplink signals cannot be received by the common signal detector 424 and can accordingly be attenuated to a power level of substantially zero at the common signal detector 424. Additionally, in other embodiments, the attenuation unit 426 can be an amplifier chain configured to apply a gain of less than one to the uplink signals when instructed to attenuate the uplink signals.

Therefore, the signal booster 402 can be configured such that uplink and downlink signals can pass through the same amplification path (e.g., the common amplification path 419), and also such that the uplink and downlink signals can be detected using the same signal detector (e.g., the common signal detector 424). Further, the signal booster 402 can be configured such that the uplink and downlink signals can be filtered in the common amplification path 419.

Modifications, additions, or omissions can be made to the signal booster 402 without departing from the scope of the present disclosure. For example, in embodiments where the downlink signals received by the signal booster 402 can be much stronger than the uplink signals received by the signal booster 402, the attenuation unit 426 can be communicatively coupled between a downlink port 434 of the splitting duplexer 430 and a downlink port 444 of the combining duplexer 440 instead of between the uplink port 436 of the splitting duplexer 430 and the uplink port 446 of the combining duplexer 446. Moreover, in these and other embodiments, the control unit 422 can be configured to direct the attenuation of the downlink signals instead of the uplink signals.

Further, in some embodiments an uplink attenuation unit can be communicatively coupled between the duplexer 412a and the duplexer 412d in addition to or instead of having the attenuation unit 426 communicatively coupled between the uplink ports 436 and 446 of the splitting duplexer 430 and the combining duplexer 440, respectively. In applicable embodiments, a downlink attenuation unit can be communicatively coupled between the duplexer 412b and the duplexer 412d.

Additionally, in some embodiments, the common amplification path 419 can include a downlink gain block communicatively coupled between the downlink ports 434 and 444 of the duplexers 430 and 440, respectively. The downlink gain block can accordingly be configured to receive and apply and/or adjust a gain to the downlink signals but not the uplink signals. In some embodiments, the downlink gain block can be configured to apply and/or adjust the gain in response to instructions received from the control unit 422. The downlink gain block can be any suitable system, apparatus, or device configured to apply a gain to the downlink signals received by the downlink gain block. For example, the downlink gain block can include an amplifier chain and/or an attenuator.

In these or other embodiments, the common amplification path 419 can include an uplink gain block communicatively coupled between the uplink ports 436 and 446 of the duplexers 430 and 440, respectively. The uplink gain block can be configured to receive and apply and/or adjust a gain to the uplink signals but not the downlink signals. In some embodiments, the uplink gain block can be configured to apply the gain in response to instructions received from the control unit 422. The uplink gain block can be any suitable system, apparatus, or device configured to apply a gain to the uplink signals received by the uplink gain block. For example, the uplink gain block can include an amplifier chain and/or an attenuator.

Additionally, in some embodiments, an uplink attenuation unit can be communicatively coupled between the uplink ports of the splitting and combining duplexers and a downlink attenuation unit can also be communicatively coupled between the downlink ports of the splitting and combining duplexers. In these embodiments, the control unit 422 can direct the uplink attenuating unit to attenuate the uplink signals to measure the power of the downlink signals and vice versa. Additionally, the location of the common signal detector 424 with respect to other components of the common amplification path 419 can vary depending on particular embodiments.

Further, in some embodiments, the common signal detector 424 and the attenuation unit 426 can be communicatively coupled between the duplexer 412a and the first interface port 409 instead of being included in the common amplification path 419. In other embodiments, the common signal detector 424 and the attenuation unit 426 can be communicatively coupled between the duplexer 412b and the second interface port 411 instead of being included in the common amplification path 419. An example of one of these embodiments is described below with respect to FIG. 5. Accordingly, using the same signal detector to detect uplink and downlink signals is not limited to embodiments of signal boosters that can include a common amplification path, as also described below in FIG. 5.

Figure 5:
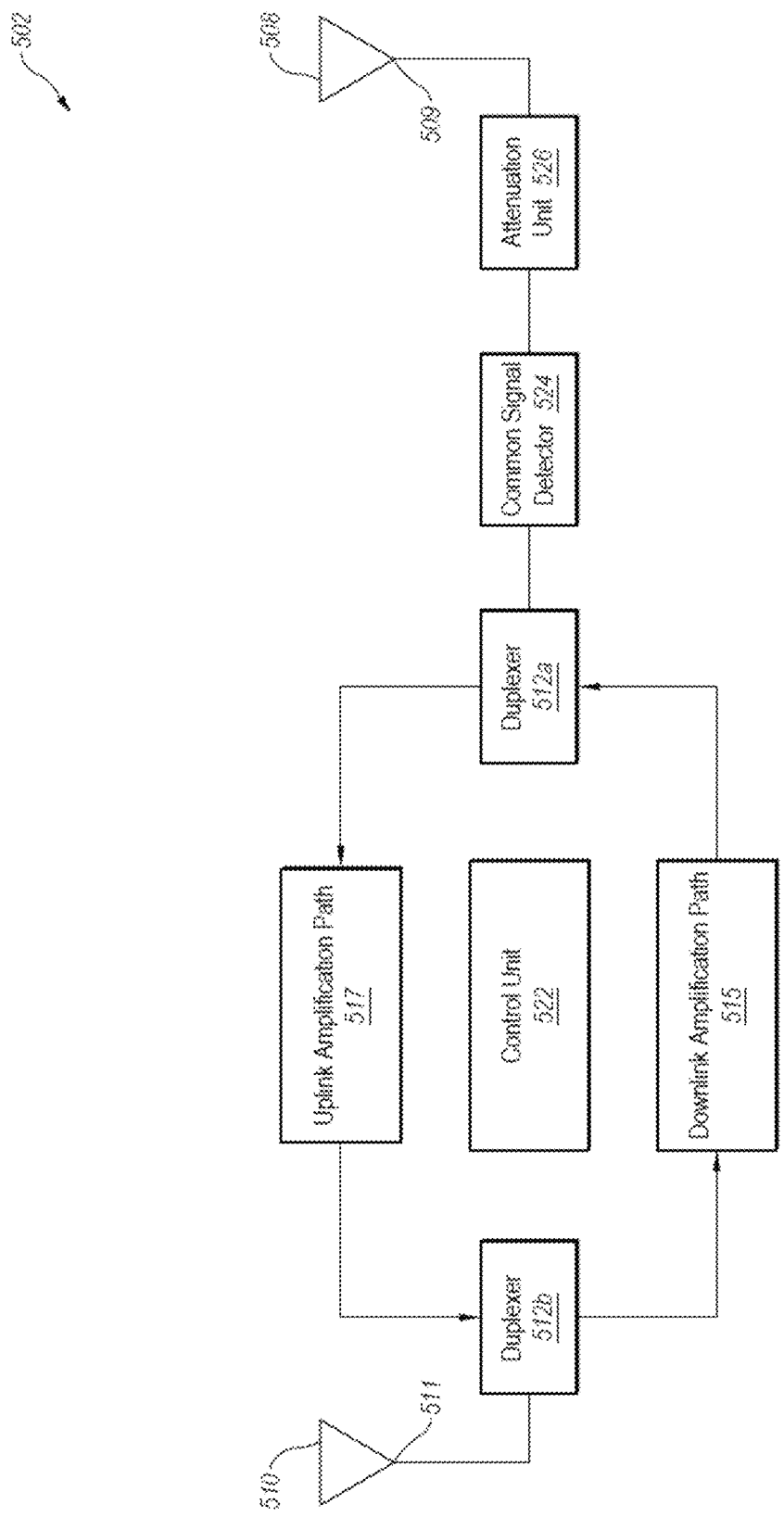
FIG. 5 illustrates embodiments of a bi-directional signal booster with a common signal detector in accordance with an example.

FIG. 5 illustrates an example embodiment of a bi-directional signal booster 502 (referred to hereinafter as "the signal booster 502") with a common signal detector 524, arranged in accordance with the least some embodiments described herein. In some embodiments, the signal booster 502 can be configured to operate in a manner analogous to the operation of the signal booster 102 of the system 100 of FIG. 1. The signal booster 502 can include a first interface port 509 communicatively coupled to a first antenna 508, a second interface port 511 communicatively coupled to a second antenna 510, and a downlink amplification path 515 and an uplink amplification path 517, each communicatively coupled between the first interface port 509 and the second interface port 511.

The signal booster 502 can also include duplexers 512a and 512b. The duplexer 512a can be any suitable system, apparatus, or device configured to direct uplink signals that can be received at the first interface port 509 toward the uplink amplification path 517. The duplexer 512a can also be configured to receive downlink signals that can exit the downlink amplification path 515 and direct the downlink signals toward the first interface port 509 and the first antenna 508. The duplexer 512b can be any suitable system, apparatus, or device configured to direct downlink signals that can be received at the second interface port 511 toward the downlink amplification path 515. The duplexer 512b can also be configured to receive uplink signals that can exit the uplink amplification path 517 and direct the uplink signals toward the second interface port 511 and the second antenna 510. Accordingly, in the illustrated embodiment of FIG. 5, the uplink and downlink signals can be directed to separate amplification paths, instead of a common amplification path.

In the illustrated embodiment, the signal booster 502 can also include a control unit 522, the common signal detector 524 and an attenuation unit 526. The control unit 522, the common signal detector 524, and the attenuation unit 526 can be analogous to the control unit 422, the common signal detector 424, and the attenuation unit 426, respectively, of the signal booster 402 of FIG. 4. The common signal detector 524 can be communicatively coupled between the duplexer 512a and the attenuation unit 526 such that the common signal detector 524 can receive downlink signals that can be output by the duplexer 512a and uplink signals that can be output by the attenuation unit 526.

In the illustrated embodiment, and similar to that of FIG. 4, the signal booster 502 can be configured for instances when uplink signals received by the signal booster 502 can be much stronger than the downlink signals. Therefore, when the control unit 522 determines a power level of the downlink signals, the control unit 522 can direct the attenuation unit 526 to attenuate the uplink signals that can be received at the first interface port 509 and that can pass through the attenuation unit 526 to the common signal detector 524. Therefore, downlink signals communicated to the common signal detector 524 from the duplexer 512a can be substantially stronger than the uplink signals communicated to the common signal detector 524 from the attenuation unit 526. As such, the control unit 522 can determine that the power detected by the common signal detector 524 can be associated with the downlink signals when the uplink signals are being attenuated.

Additionally, similar to as described with respect to the signal booster 402 of FIG. 4, when the control unit 522 determines a power level of the uplink signals, the control unit 522 can direct the attenuation unit 526 to cease the attenuation or substantially reduce the attenuation of the uplink signals. As mentioned above, because the received uplink signals can be much stronger than the downlink signals in the illustrated embodiment, even after the downlink signals have been amplified, the downlink signal power that can be included in the power detected by the common signal detector 524 can be substantially negligible compared to the power of the uplink signals when the attenuation of the uplink signals is ceased or substantially reduced.

Therefore, the control unit 522 can be configured to determine that the power levels detected by the common signal detector 524 can be substantially associated with the uplink signals when the attenuation of the uplink signals is ceased or substantially reduced. In other embodiments, such as when the amplified downlink signal power may not be negligible, the amplification applied by the downlink amplification path 515 can be reduced during uplink signal detection such that the amplified downlink power can be reduced. For example, in some embodiments, the gain of the downlink amplification path can be reduced or the downlink amplification path 515 can be turned off such that the downlink signals cannot pass through the downlink amplification path 515 to be received by the common signal detector 524. Therefore, the signal booster 502 can be configured to detect the power of both uplink and downlink signals using the same signal detector (e.g., the common signal detector 524) even when the signal booster 502 cannot include a common amplification path.

Modifications, additions, or omissions can be made to the signal booster 502 without departing from the scope of the present disclosure. For example, in embodiments where the downlink signals received by the signal booster 502 can be much stronger than the uplink signals received by the signal booster 502, the attenuation unit 526 and the common signal detector 524 can be communicatively coupled between the duplexer 512b and the second interface port 511 instead of between the duplexer 512a and the first interface port 509.

Additionally, in some embodiments, a first attenuation unit can be communicatively coupled between the first interface port 509 and the duplexer 512a. Also, a second attenuation unit can be communicatively coupled between the second interface port 511 and the duplexer 512b and/or the second attenuation unit can be communicatively coupled between the duplexer 512a and the common signal detector 524. In these embodiments, the common signal detector 524 can be communicatively coupled somewhere between the first and second attenuation units and such that the common signal detector 524 can receive both uplink and downlink signals. In these embodiments, the control unit 522 can direct the first attenuating unit to attenuate the uplink signals that can be received at the first interface port 509 to measure the power of the downlink signals and vice versa.

Further, in some embodiments, the signal booster 502 can also include one or more common amplification paths that can be configured to receive uplink and downlink signals that can be associated with different bands than the uplink and downlink signals that can be received by the uplink amplification path 517 and the downlink amplification path 515, respectively. Moreover, the placement of a common signal detector and an attenuation unit between a duplexer and an antenna port, such as shown in FIG. 5, can also be used in embodiments where a common amplification path can be included between the duplexer and the other antenna port, such as in the embodiments of signal boosters described above with respect to FIGS. 2-4. Additionally, in some embodiments, a common signal detector can be configured such that it can receive and detect different uplink and downlink signals transmitted in and associated with more than one communication band, as described in further detail below with respect to FIG. 6.

Figure 6:
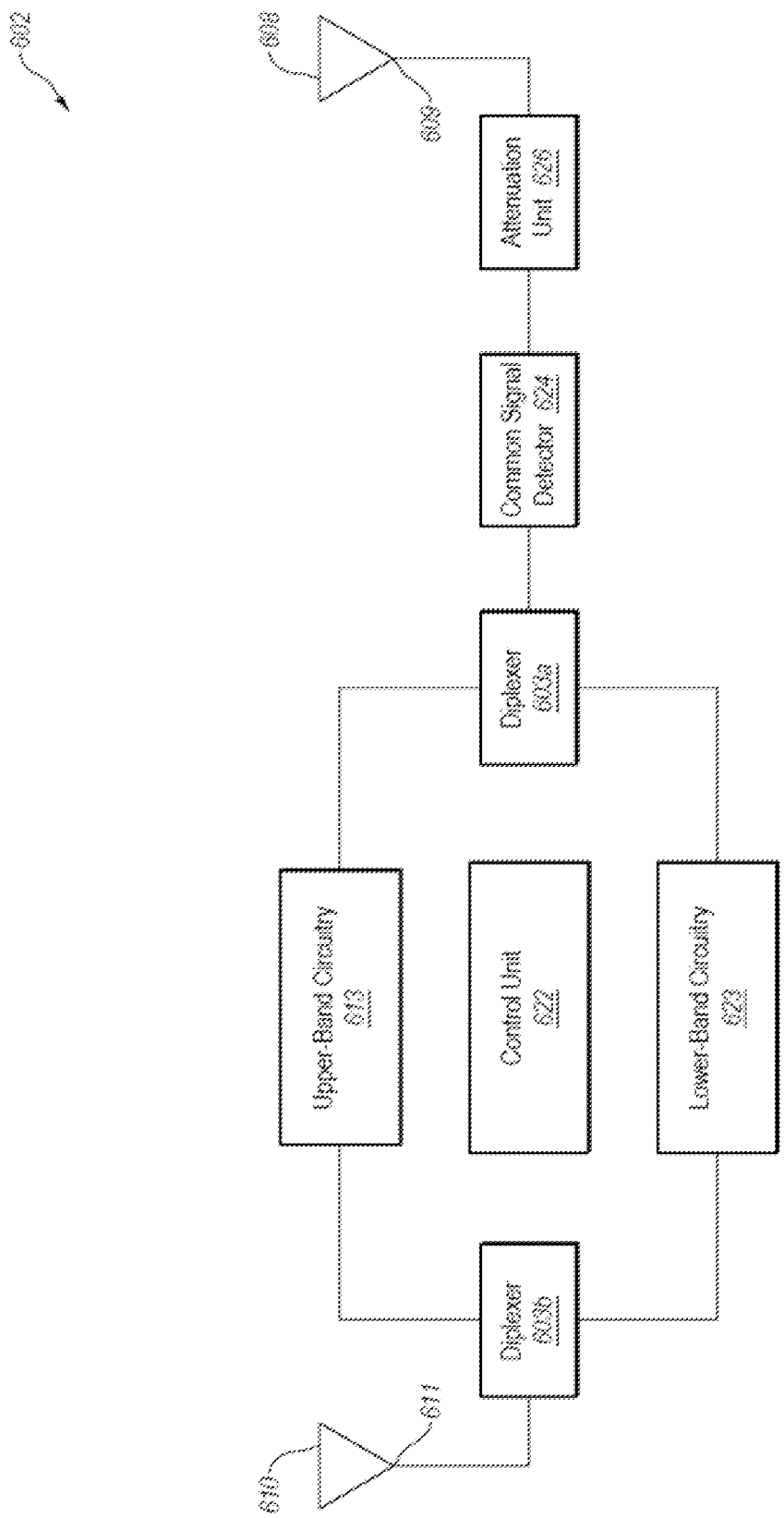
FIG. 6 illustrates embodiments of a bi-directional signal booster with a common signal detector in accordance with an example.

FIG. 6 illustrates an example embodiment of a bi-directional signal booster 602 (referred to hereinafter as "the signal booster 602") with a common signal detector 624, arranged in accordance with at least some embodiments described herein. In some embodiments, the signal booster 602 can be configured to operate in a manner analogous to the operation of the signal booster 102 of the system 100. The signal booster 602 can include a first interface port 609 communicatively coupled to a first antenna 608, a second interface port 611 communicatively coupled to a second antenna 610, and upper-band circuitry 613 and lower-band circuitry 623, each communicatively coupled between the first interface port 609 and the second interface port 611.

The upper-band circuitry 613 can be configured to receive and process (e.g., amplify) uplink and downlink signals that can be communicated in an upper frequency band that can be used by a wireless communication system. The uplink and downlink frequencies associated with the upper frequency band can be referred to hereinafter as "upper-band uplink signals" and "upper-band downlink signals." By way of example, in some embodiments, the upper-band circuitry 613 can be configured to process uplink and downlink signals transmitted in a 1,900 MHz frequency range.

In some embodiments, the upper-band circuitry 613 can include an uplink amplification path and a downlink amplification path that can be configured to receive and process the upper-band uplink and downlink signals in an analogous manner as described with respect to the uplink amplification path 517 and the downlink amplification 515, respectively, of FIG. 5 receiving and processing uplink and downlink signals. In these and other embodiments, the upper-band circuitry 613 can include a common direction amplification path configured to receive and process the upper-band uplink and downlink signals in an analogous manner as described with respect to one of the common direction amplification paths 219, 319, or 419 of FIGS. 2, 3, and 4, respectively, receiving and processing uplink and downlink signals.

The lower-band circuitry 623 can be configured to receive and process uplink and downlink signals that can be communicated in a lower frequency band that can be used by the wireless communication system. The uplink and downlink frequencies associated with the lower frequency band can be referred to hereinafter as "lower-band uplink signals" and "lower-band downlink signals." By way of example, in some embodiments, the lower-band circuitry 623 can be configured to process uplink and downlink signals transmitted in 700 MHz frequency range and/or an 800 MHz frequency range.

In some embodiments, the lower-band circuitry 623 can include an uplink amplification path and a downlink amplification path that can be configured to receive and process and the lower-band uplink and downlink signals in an analogous manner as described with respect to the uplink amplification path 517 and the downlink amplification 515, respectively, of FIG. 5 receiving and processing uplink and downlink signals. In these and other embodiments, the lower-band circuitry 623 can include a common direction amplification path configured to receive and process the lower-band uplink and downlink signals in an analogous manner as described with respect to one of the common direction amplification paths 219, 319, or 419 of FIGS. 2, 3, and 4, respectively, receiving and processing uplink and downlink signals.

The signal booster 602 can also include diplexers 603a and 603b. The diplexer 603a can be any suitable system, apparatus, or device configured to direct upper-band uplink signals and lower-band uplink signals that can be received at the first interface port 609 toward the upper-band circuitry 613 and the lower-band circuitry 623, respectively. The diplexer 603a can also be configured to receive upper-band downlink signals and lower-band downlink signals that can exit the upper-band circuitry 613 and the lower-band circuitry 623, respectively, and direct the upper-band and lower-band downlink signals toward the first interface port 609 and the first antenna 608. The diplexer 603b can be any suitable system, apparatus, or device configured to direct upper-band downlink signals and lower-band downlink signal that can be received at the second interface port 611 toward the upper-band circuitry 613 and the lower-band circuitry 623, respectively. The diplexer 603b can also be configured to receive upper-band uplink signals and lower-band uplink signals that can exit the upper-band circuitry 613 and the lower-band circuitry 623, respectively, and direct the upper-band and lower-band uplink signals toward the second interface port 611 and the second antenna 610.

In the illustrated embodiment, the signal booster 602 can also include a control unit 622, the common signal detector 624, and an attenuation unit 626. The control unit 622, the common signal detector 624, and the attenuation unit 626 can be analogous to the control unit 522, the common signal detector 524, and the attenuation unit 526, respectively, of the signal booster 502 of FIG. 5. In the illustrated embodiment, the common signal detector 624 can be communicatively coupled between the diplexer 603a and the attenuation unit 626 such that that the common signal detector 624 can receive upper-band downlink signals and lower-band downlink signals that can be output by the upper-band circuitry 613 and the lower-band circuitry 623, respectively. Additionally, the common signal detector 624 can receive upper-band uplink signals and lower-band uplink signals that can be output by the attenuation unit 626.

In the illustrated embodiment, and similar to that of FIGS. 4 and 5, the signal booster 602 can be configured for instances when uplink signals received by the signal booster 602 can be much stronger than the downlink signals. Therefore, to determine a power level of the downlink signals (upper-band and/or lower-band), the control unit 622 can direct the attenuation unit 626 to attenuate the uplink signals (upper-band and/or lower-band) that can be received at the first interface port 609 and that can pass through the attenuation unit 626 to the common signal detector 624. Therefore, downlink signals communicated to the common signal detector 624 from the diplexer 603a can be substantially stronger than the uplink signals communicated to the common signal detector 624 from the attenuation unit 626. As such, the control unit 622 can determine that the power detected by the common signal detector 624 can be associated with the downlink signals when the uplink signals are being attenuated.

Further, in some embodiments, to determine the power of the lower-band downlink signals, but not the upper-band downlink signals, in addition to attenuating the uplink signals via the attenuation unit 626, the control unit 622 can direct the upper-band circuitry 613 to modify the amplification that can be applied to the upper-band downlink signals such that the power that can be detected by the common signal detector 624 can largely be associated with the lower-band downlink signals. For example, the control unit 622 can direct the upper-band circuitry 613 to lower the gain applied to the upper-band downlink signals, open a switch configured such that when the switch is open the upper-band downlink signals cannot reach the diplexer 603a, or turn off any suitable circuitry that can be configured to receive the upper-band downlink signals and can be configured such that when turned off, the upper-band downlink signals cannot pass through the circuitry. The control unit 622 can perform analogous operations with respect to the lower-band circuitry 623 and lower-band downlink signals to detect the power of the upper-band downlink signals.

Additionally, similar to as described with respect to the signal boosters 402 and 502 of FIGS. 4 and 5, respectively, to determine a power level of the uplink signals (upper-band and/or lower-band), the control unit 622 can direct the attenuation unit 626 to cease or substantially reduce the attenuation of the uplink signals. As mentioned above, because the received uplink signals can be much stronger than the downlink signals in the illustrated embodiment, even after the downlink signals have been amplified, the downlink signal power that can be included in the power detected by the common signal detector 624 can be substantially negligible compared to the power of the uplink signals when the attenuation of the uplink signals is ceased or substantially reduced.

Therefore, the control unit 622 can be configured to determine that the power levels detected by the common signal detector 624 can be substantially associated with the uplink signals when the attenuation of the uplink signals is ceased or substantially reduced. In other embodiments, such as when the amplified downlink signal power may not be negligible, the amplification applied to the downlink signals can be reduced during uplink signal detection such that the amplified downlink power can be reduced. For example, in some embodiments, the gain applied to the upper-band and/or lower-band downlink signals can be reduced, one or more switches configured such that when the switches are open the upper-band downlink signals and/or lower-band downlink signals cannot reach the diplexer 603a can be opened. In these or other embodiments, any suitable circuitry that can be configured to receive the upper-band downlink signals and/or the lower-band downlink signals and that can be configured such that when turned off the upper-band downlink signals cannot pass through the circuitry can be turned off. Therefore, the signal booster 602 can be configured to detect the power of upper-band and lower-band uplink and downlink signals using the same signal detector (e.g., the common signal detector 624).

Modifications, additions, or omissions can be made to the signal booster 602 without departing from the scope of the present disclosure. For example, in embodiments where the downlink signals received by the signal booster 602 can be much stronger than the uplink signals received by the signal booster 602, the attenuation unit 626 and the common signal detector 624 can be communicatively coupled between the diplexer 603b and the second interface port 611 instead of between the diplexer 603a and the first interface port 609.

Additionally, in some embodiments, a first attenuation unit can be communicatively coupled between the first interface port 609 and the diplexer 603a and a second attenuation unit can be communicatively coupled between the second interface port 611 and the diplexer 603b. In these embodiments, the common signal detector 624 can be communicatively coupled between the first attenuation unit and the diplexer 603a or between the second attenuation unit and the diplexer 603b. Additionally, in these embodiments, the control unit 622 can direct the first attenuating unit to attenuate the uplink signals that can be received at the first interface port 609 to measure the power of the downlink signals and vice versa.

Moreover, in some embodiments, an upper-band common signal detector and an upper-band attenuation unit can be placed between the upper-band circuitry 613 and the diplexer 603a or diplexer 603b, or within the upper-band circuitry 613 (e.g., within a common amplification path of the upper-band circuitry 613). Therefore, the upper-band common signal detector can be configured to detect power associated with the upper-band uplink and downlink signals. In these or other embodiments, a lower-band common signal detector and a lower-band attenuation unit can be placed between the lower-band circuitry 623 and the diplexer 603a or diplexer 603b, or within the lower-band circuitry 623 (e.g., within a common amplification path of the lower-band circuitry 623). Therefore, the lower-band common signal detector can be configured to detect power associated with the lower-band uplink and downlink signals.

Further, the number of circuits associated with different communication bands within the signal booster 602 can vary without departing from the scope of the disclosure. For example, in some embodiments, the signal booster 602 can include a triplexer that can direct upper-band signals to the upper-band circuitry 613, that can direct mid-band signals to mid-band circuitry (not expressly depicted in FIG. 6), and that can direct lower-band signals to the lower-band circuitry 623.

Additionally, the use of the terms "upper-band" and "lower-band" is merely to differentiate between bands that can be associated with different frequency ranges. The difference in frequency between the upper-band and the lower-band can vary greatly depending on the particular application. For example, in some instances, the upper-band can be the 800 MHz frequency range and the lower-band can be the 700 MHz frequency range. In other embodiments, the upper-band can be the 1,900 MHz frequency range and the lower-band can be the 700 MHz and/or the 800 MHz frequency range. Additionally, in some embodiments, the upper-band and the lower-band can both be included in the 700 MHz frequency range, the 800 MHz frequency range, the 1,900 MHz frequency range, or any other suitable frequency range. In some embodiments, the upper-band can include LTE frequency band 4 or 25, and the low-band can include LTE frequency bands 5, 12, or 13.

Figure 7:
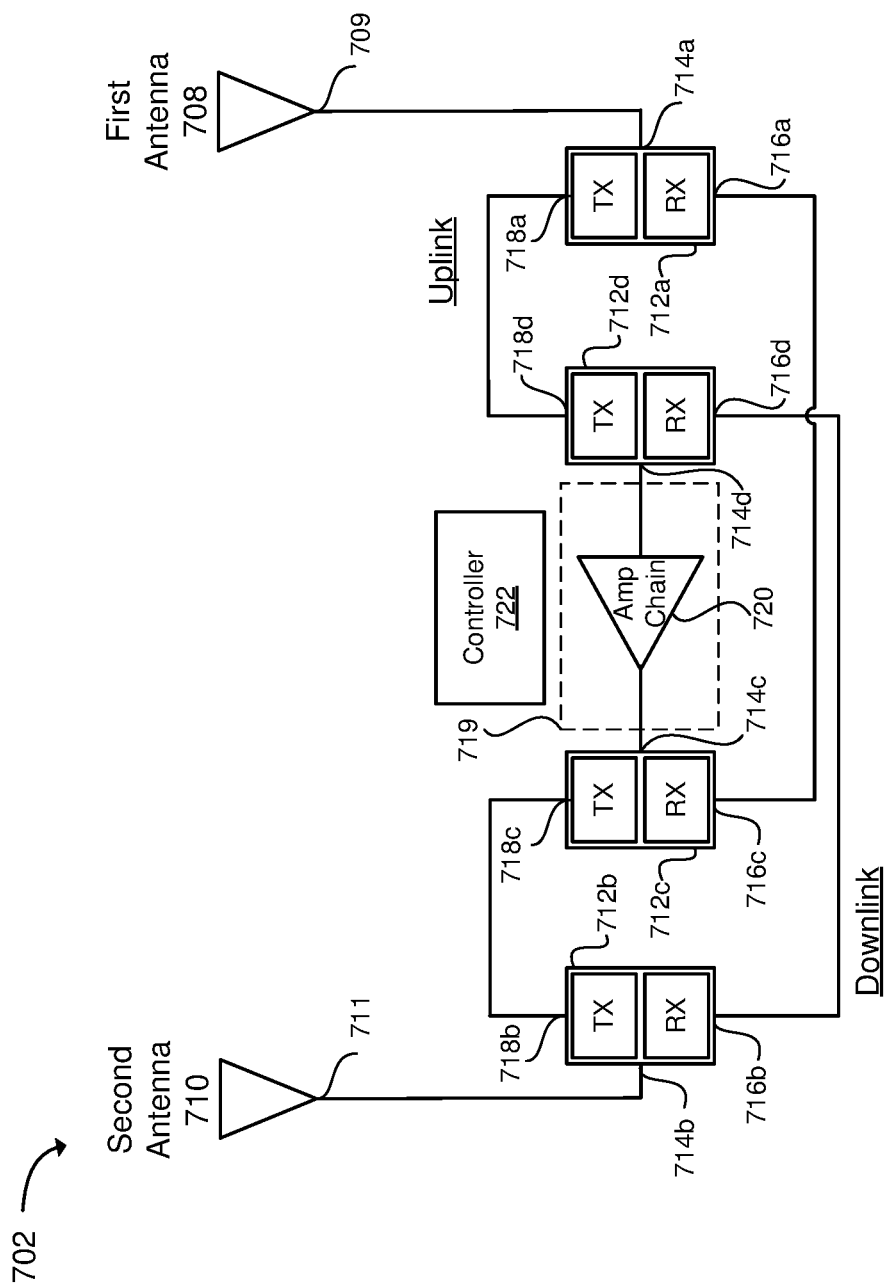
FIG. 7 illustrates an embodiment of a bi-directional signal booster with a common amplification path, in accordance with an example.

FIG. 7 illustrates another perspective of the illustration of FIG. 2. To provide clarity, each single duplexer in FIG. 7 is shown with a Tx filter and an Rx filter. In this example, each Rx filter can pass a downlink signal received from an access point (i.e. 104). Each Tx filter can pass an uplink signal received from a wireless device (i.e. 106). This is not intended to be limiting. The Rx filter may be configured to pass an uplink signal and the Tx filter may be configured to pass a downlink signal. The Tx and Rx filters are configured to pass signals of opposing directions (i.e. uplink and downlink or downlink and uplink).

The signal booster 702 can be configured such that uplink signals that are received at the first interface port 709 from the first antenna 708 can be directed toward the common amplification path 719. The signal booster 702 can also be configured such that the uplink signals can be directed from the common amplification path 719 toward the second interface port 711 and the second antenna 710. In one example, the first antenna 708 can be a server antenna and the second antenna 710 can be a donor antenna. Additionally, the signal booster 702 can also be configured such that downlink signals that are received at the second interface port 711 from the second antenna 710 can be directed toward the common amplification path 719. The signal booster 702 can also be configured to direct the downlink signals from the common amplification path 719 toward the first interface port 709 and the first antenna 708. Accordingly, the signal booster 702 can be configured such that the common amplification path 719 can receive and amplify both the downlink signals and the uplink signals.

In some embodiments, the signal booster 702 can also include duplexers 712a-712d that can be configured to direct the uplink signals from the first interface port 709 toward the common amplification path 719 and from the common amplification path 219 toward the second interface port 711. The duplexers 712a-712d can also be configured to direct the downlink signals from the second interface port 711 toward the common amplification path 719 and from the common amplification path 719 toward the first interface port 709.

The duplexer 712a can include a common port 714a, a downlink port 716a and an uplink port 718a. The duplexer 712b can include a common port 714b, a downlink port 716b and an uplink port 718b. The duplexer 712c can include a common port 714c, a downlink port 716c and an uplink port 718c, and the duplexer 712d can include a common port 714d, a downlink port 716d and an uplink port 718d. Each duplexer 712 can be configured such that downlink signals received at their respective common ports 714 are directed out of their respective downlink ports 716 and such that uplink signals received at their respective common ports 714 are directed out of their respective uplink ports 718. Additionally, each duplexer 712 can be configured such that downlink signals received at their respective downlink ports 716 can be directed out of their respective common ports 714 and such that uplink signals received at their respective uplink ports 718 can be directed out of their respective common ports 714.

In some embodiments, the duplexers 712a-712d can be configured to direct the uplink and downlink signals using filters configured based on frequency ranges associated with the uplink and downlink signals. For example, a particular duplexer 712 can include an uplink filter communicatively coupled between its common port 714 and its uplink port 718. The uplink filter can be configured to filter signals based on uplink signal frequencies such that frequencies within the uplink signal frequencies can pass through the uplink filter and frequencies outside of the uplink signal frequencies may be filtered out by the uplink filter. The particular duplexer 712 can also include a downlink filter communicatively coupled between its common port 714 and its downlink port 716. Each downlink filter can be configured to filter signals based on downlink signal frequencies such that frequencies within the downlink signal frequencies can pass through the downlink filter and frequencies outside of the downlink signal frequencies can be filtered out by the downlink filter.

With respect to uplink signals, in the illustrated embodiment, the common port 714a of the duplexer 712a can be communicatively coupled to the first interface port 709 such that the common port 714a can receive uplink signals that can be received by the first interface port 709 via the first antenna 708. The duplexer 712a can direct the uplink signals received at the common port 714a to be output at the uplink port 718a of the duplexer 712a, which can be communicatively coupled to the uplink port 718d of the duplexer 712d. The duplexer 712d can be configured to direct the uplink signals received at the uplink port 718d to be output at the common port 714d. The common port 714d can be communicatively coupled to the common amplification path 719 such that the duplexer 712d may direct the uplink signals toward the common amplification path 719. Therefore, the duplexer 712a and the duplexer 712d can be configured to direct the uplink signals from the first interface port 709 toward the common amplification path 719.

With respect to downlink signals, in the illustrated embodiment, the common port 714b of the duplexer 712b can be communicatively coupled to the second interface port 711 such that the common port 714b can receive downlink signals that can be received by the second interface port 711 via the second antenna 710. The duplexer 712b can direct the downlink signals received at the common port 714b to be output at the downlink port 716b of the duplexer 712b, which can be communicatively coupled to the downlink port 716d of the duplexer 712d. The duplexer 712d can be configured to direct the downlink signals received at the downlink port 716d to be output at the common port 714d. As mentioned above, the common port 714d can be communicatively coupled to the common amplification path 719 such that the duplexer 712d can direct the downlink signals toward the common amplification path 719. Therefore, the duplexer 712b and the duplexer 712d can be configured to direct the downlink signals from the second interface port 711 toward the common amplification path 719.

The common amplification path 719 can include one or more common amplifier chains, such as a common amplifier chain 720. The common amplifier chain 720 can include one or more common amplifiers configured to apply a gain to signals received by the common amplifier chain 720. In the illustrated embodiment, the common amplifier chain 720 can be communicatively coupled to the common port 714d of the duplexer 712d. Therefore, the common amplifier chain 720 can be configured to receive both uplink and downlink signals such that the common amplifier chain 720 can apply a gain to both the downlink signals and the uplink signals that can be output by the duplexer 712d. As mentioned above, the gain can be a set gain or a variable gain and can be less than, equal to, or greater than one. In some embodiments the gain of the common amplifier chain 720 can be adjusted by a control unit 722 communicatively coupled to the common amplifier chain 720. In some embodiments the control unit 722 can adjust the gain of the common amplifier chain 720 based on wireless communication conditions.

If included in the signal booster 702, the control unit 722 can be implemented by any suitable mechanism, such as a program, software, function, library, software as a service, analog or digital circuitry, or any combination thereof. The control unit 722 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the common amplifier chain 720. For example, the adjustments can be based on radio frequency (RF) signal inputs.

The common amplifier chain 720 can be communicatively coupled to the common port 714c of the duplexer 712c such that the common port 714c can receive both the uplink signals and the downlink signals output by the common amplifier chain 720. The duplexer 712c can be configured to direct the downlink signals from the common port 714c toward the downlink port 716c and direct the uplink signals from the common port 714c toward the uplink port 718c. The downlink port 716c of the duplexer 712c can be communicatively coupled to the downlink port 716a of the duplexer 712a such that the duplexer 712c can be configured to direct the downlink signals toward the downlink port 716a of the duplexer 712a. Similarly, the uplink port 718c of the duplexer 712c can be communicatively coupled to the uplink port 718b of the duplexer 712b such that the duplexer 712c can be configured to direct the uplink signals toward the uplink port 718b of the duplexer 712b.

The duplexer 712a can direct the downlink signals from the downlink port 716a toward the common port 714a such that the downlink signals can be communicated from the common port 714a toward the first antenna 708 via the first interface port 709. The duplexer 712b can direct the uplink signals from the uplink port 718b toward the common port 714b such that the uplink signals can be communicated from the common port 714b toward the second antenna 710 via the second interface port 711.

Therefore, the duplexers 712a-712d of the signal booster 702 can be configured to direct uplink signals received at the first interface port 709 toward the common amplification path 719 and from the common amplification path 719 toward the second interface port 711. Additionally, the duplexers 712a-712d can be configured to direct downlink signals received at the second interface port 711 toward the common amplification path 719 and from the common amplification path 719 toward the first interface port 709. Therefore, the signal booster 702 can be configured such that both downlink signals and uplink signals can pass through and be amplified by one or more common amplifier chains 720 of the common amplification path 719, which can reduce the number of components within the signal booster 702.

FIGS. 2-7 provide embodiments in which duplexers are used in a signal booster to direct uplink and downlink signals such that both downlink signals and uplink signals can pass through and be amplified by one or more common amplifier chains of a common amplification path, thereby reducing the number of components within the signal boost.

Each duplexer in a signal booster creates a certain amount of insertion loss as the downlink signal(s) and/or uplink signal(s) are directed through the duplexers in a signal booster. The insertion loss can reduce the power in the uplink or downlink signal(s) and/or increase the noise floor of the downlink signal(s) and/or uplink signal(s).

In one embodiment, the amount of insertion loss caused by multiple duplexers in series within a signal booster can be reduced by combining the duplexers in a single package. A combined duplexer can also decrease the noise floor, relative to multiple duplexers located in series.

In one example embodiment, illustrated in FIG. 8a, a combined duplexer 830 comprises a first first-direction (i.e. uplink or downlink) filter 804 with a first pass-frequency, a first second-direction (i.e. downlink or uplink) filter 806 with a second pass-frequency that is different from the first pass-frequency, and one or more additional first-direction filters 804 or second direction filters 806 with the same first pass-frequency or second pass-frequency. As illustrated in FIG. 8a, the additional filter would be a first-direction filter since it is adjacent to a second direction filter. If the additional filter is selected to be a second direction filter, then it would be positioned above the first direction filter.

Accordingly, the combined duplexer 830 includes at least three filters, wherein two or more of the at least three filters have the same pass-frequency (i.e. the first-pass frequency or the second-pass frequency. Each of the pass-frequency filters in the combined duplexer 830 can be a band-pass filter, a high-pass filter, or a low pass filter. Each duplexer formed in the combined duplexer is comprised of a first direction filter and a second direction filter. Accordingly, each first direction filter can be located next to a second direction filter, and vice versa. The filter design in each first direction filter in the combined duplexer will be substantially identical. Similarly, the filter design in each second direction filter in the combined duplexer will be substantially identical. The same filter design is used for each first direction filter or second direction filter. There can be slight differences in an output of each filter due to slight variations caused in the manufacture of each filter. But the intent is to have each first direction filter the same as other first direction filters, and each second direction filter the same as other second direction filters. The paths through the combined multiplexer are bi-directional. A signal can pass in either direction.

In contrast to a combined duplexer, a typical multiplexer includes multiple different filters, with each filter having a different pass-frequency (i.e. high-pass, band-pass, or low-pass). A multiplexer does not include multiple filters having the same pass-frequency.

In the combined duplexer 830 of FIG. 8a, each combination of a first direction filter 804 and a second direction filter 806 can have three separate electrical connections to form a duplexer 812. For example, a first duplexer 812a in the combined duplexer 830 includes a first electrical connection to a common port 814a, a second electrical connection to a second direction port 816a, and a third electrical connection to a second direction port 818a. A second duplexer 812b in the combined duplexer 830 includes a first electrical connection to a common port 814b, a second electrical connection to a first direction port 816b, and a third electrical connection to a second direction port 818b.

FIG. 8b illustrates a combined duplexer 840 with two first direction filters 804 and two second direction filters 806. The combined duplexer 840 includes a first duplexer 812a, a second duplexer 812b, and a third duplexer 812c. Each combined duplexer includes a first direction filter 804 and a second direction filter 806. Similarly, FIG. 8c illustrates a combined duplexer 850 with three first direction filters 804 and two second direction filters 806. The combined duplexer 850 includes a first duplexer 812a, a second duplexer 812b, a third duplexer 812c, and a fourth duplexer 812d. Each first direction filter 804 in FIGS. 8a-c is configured for the same first-pass frequency. Each second direction filter is configured for the same second-pass frequency. Because there are two or more filters having the same pass frequency (i.e. bandpass, low pass, or high pass), the first direction filter(s) 804 and/or second direction filter(s) 806 can be shared with adjacent duplexers. This allows a higher density of duplexers to be formed from fewer directional filters. When using standard duplexers, there are 2N direction filters to form N duplexers. In the combined duplexers illustrated in FIGS. 8a-c, N duplexers can be formed using N+1 directional filters. Each of the N duplexers include a first direction filter and a second directional filter. Accordingly, five separate duplexers would use ten directional filters, while five duplexers in a combined duplexer would only use six directional filters. The reduced number of directional filters can reduce insertion loss and noise power, reduce the cost of the components, and reduce the size of the components on a circuit board or other type of electronics package. In the examples illustrated in the combined duplexers 830, 840, and 850, the direction filters can be internally arranged such that either of the single direction ports can be made available at a combined duplexer's input/output. In one example, the input/output can be an input/output (I/O) block.

Figure 8D:
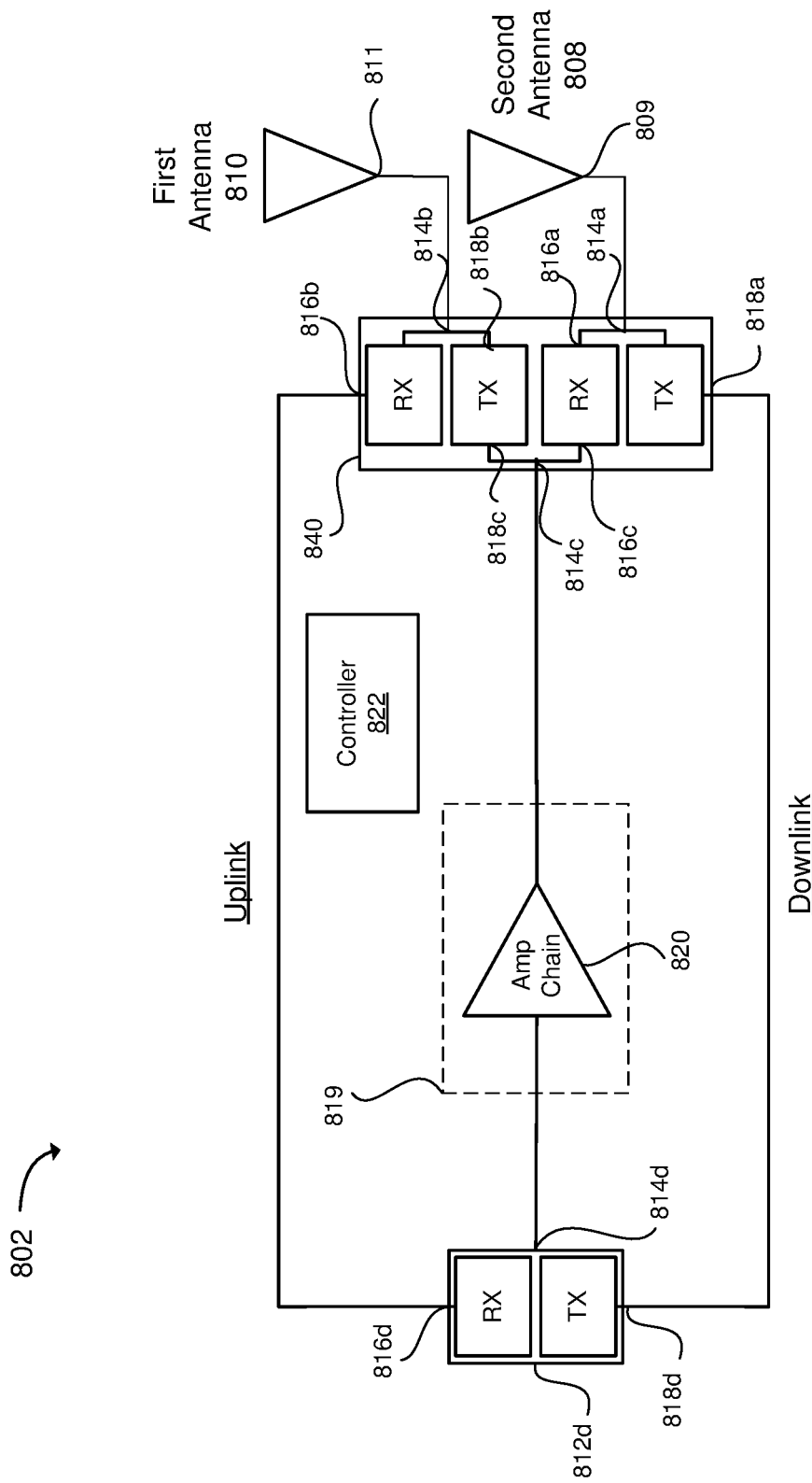
FIG. 8d illustrates an embodiment of a bi-directional signal booster with a common amplification path using a combined duplexer, in accordance with an example.

FIG. 8d provides an example illustration of a signal booster 802 having a combined duplexer 840. The combined duplexer 840 can reduce the number of duplexers used in FIG. 7 from four duplexers (712a-d) to two duplexers, 812d and 840. The combined duplexer 840 includes two Rx filters and two Tx filters. Each Rx filter in the combined duplexer 840 can have the same pass-frequency (i.e. band-pass, high-pass, low-pass). Similarly, each Tx filter in the combined duplexer 840 can have the same pass-frequency (i.e. band-pass, high-pass, low-pass).

The number of Rx and Tx filters in the combined duplexer is not intended to be limiting. As previously discussed, the combined duplexer can include one Rx filter, one Tx filter, and one or more additional Rx or Tx filters. Each Rx or Tx filter in a combined duplexer can be formed of any suitable analog filtering technology including, but not limited to, surface acoustic wave (SAW) filters, bulk acoustic wave (BAW) filters, film bulk acoustic resonator (FBAR) filters, ceramic filters, waveguide filters, cavity filters, or low-temperature co-fired ceramic (LTCC) filters.

While the example of the combined duplexer 840 illustrated in FIG. 8d contains two Rx filters and two Tx filters, the combined duplexer 840 can effectively provide the same capabilities as three separate duplexers (i.e. 712a-c in FIG. 7). Since each Rx filter has the same pass frequency, and each Tx filter as the same pass frequency, an Rx filter and a Tx filter in the combined duplexer can be used for more than one duplexer. For example, a single Tx filter is used as the Tx port for common port 814c and common port 814b. Similarly, a single Rx filter is sued as the Rx port for common port 814a and 814c. The ability to use the same filter for multiple common ports enables the four filters in the combined duplexer 840 to effectively form three separate duplexers.

In this example, the combined duplexer 840 includes three common ports, 814a, 814b, and 814c. Each common port can be communicatively coupled to a Tx filter and an Rx filter. An uplink signal received at any of the common ports 814 will effectively see a relatively high resistance at the Rx filter, and a relatively low resistance at the Tx filter. Accordingly, the uplink signal will pass through the Tx filter. Conversely, each downlink signal received at any of the common ports 814 will effectively see a relatively high resistance at the Tx filter, and a relatively low resistance at the Rx filter. Therefore, the downlink signal will pass through the Rx filter.

In the example of FIG. 8d, each Rx filter can pass a downlink signal received from an access point (i.e. 104). Each Tx filter can pass an uplink signal received from a wireless device (i.e. 106). The signal booster 802 can be configured such that uplink signals that are received at the first interface port 809 from the first antenna 808 can be directed toward the common amplification path 819. In this example, the first antenna 808 can be a server antenna. The signal booster 802 can also be configured such that the uplink signals can be directed from the common amplification path 819 toward the second interface port 811 and the second antenna 810. The second antenna 810 can be a donor antenna. Additionally, the signal booster 702 can also be configured such that downlink signals that are received at the second interface port 811 from the second antenna 810 can be directed toward the common amplification path 819. The signal booster 802 can also be configured to direct the downlink signals from the common amplification path 819 toward the first interface port 809 and the first antenna 808. Accordingly, the signal booster 802 can be configured such that the common amplification path 819 can receive and amplify both the downlink signals and the uplink signals.

In some embodiments, the signal booster 802 can also include a duplexer 812d and a combined duplexer 840 that can be configured to direct the uplink signals from the first interface port 809 toward the common amplification path 819 and from the common amplification path 819 toward the second interface port 811. The duplexer 812d and combined duplexer 840 can also be configured to direct the downlink signals from the second interface port 811 toward the common amplification path 819 and from the common amplification path 819 toward the first interface port 809.

The combined duplexer 840 can include a first common port 814a, a first downlink port 816a and a first uplink port 818a. The combined duplexer can include a second common port 814b, a second downlink port 816b, and a second uplink port 818b. The combined duplexer 840 can include a third common port 814c, a third downlink port 816c, and a third uplink port 818c. The duplexer 812d can include a common port 814d, a downlink port 816d and an uplink port 818d.

Duplexer 812d and combined duplexer 840 can be configured such that downlink signals received at their respective common ports 814 are directed out of their respective downlink ports 816 and such that uplink signals received at their respective common ports 814 are directed out of their respective uplink ports 818. Additionally, each duplexer 812d and 840 can be configured such that downlink signals received at their respective downlink ports 816 can be directed out of their respective common ports 814 and such that uplink signals received at their respective uplink ports 818 can be directed out of their respective common ports 814.

In some embodiments, duplexer 812d and combined duplexer 840 can be configured to direct the uplink and downlink signals using filters configured based on frequency ranges associated with the uplink and downlink signals. For example, a particular duplexer 812 or combined duplexer 840 can include an uplink filter (Tx) communicatively coupled between its common port 814 and its uplink port 818. The uplink filter can be configured to filter signals based on uplink signal frequencies such that frequencies within the uplink signal frequencies can pass through the uplink filter and frequencies outside of the uplink signal frequencies may be filtered out by the uplink filter.

The particular duplexer 812*d* or combined duplexer 840 can also include a downlink filter (Rx) communicatively coupled between its common port 814 and its downlink port 816. Each downlink filter can be configured to filter signals based on downlink signal frequencies such that frequencies within the downlink signal frequencies can pass through the downlink filter and frequencies outside of the downlink signal frequencies can be filtered out by the downlink filter.

Each downlink filter in the combined duplexer 840 can be configured to filter the same downlink frequencies. Similarly, each uplink filter in the combined duplexer 840 can be configured to filter the same uplink frequencies.

With respect to uplink signals, in the illustrated embodiment of FIG. 8*d*, the common port 814*a* of the combined duplexer can be communicatively coupled to the first interface port 809 such that the common port 814*a* can receive uplink signals that can be received by the first interface port 809 via the first antenna 808. The combined duplexer can direct the uplink signals received at the common port 814*a* to be output at the uplink port 818*a*, which can be communicatively coupled to the uplink port 818*d* of the duplexer 812*d*. The duplexer 812*d* can be configured to direct the uplink signals received at the uplink port 818*d* to be output at the common port 814*d*. The common port 814*d* can be communicatively coupled to the common amplification path 819 such that the duplexer 812*d* may direct the uplink signals toward the common amplification path 819. Therefore, the combined duplexer 840 and the duplexer 812*d* can be configured to direct the uplink signals from the first interface port 809 toward the common amplification path 819.

With respect to downlink signals, in the illustrated embodiment, the common port 814*b* of the combined duplexer 840 can be communicatively coupled to the second interface port 811 such that the common port 814*b* can receive downlink signals that can be received by the second interface port 811 via the second antenna 810. The combined duplexer 840 can direct the downlink signals received at the common port 814*b* to be output at the downlink port 816*b* of the duplexer 812*b*, which can be communicatively coupled to the downlink port 816*d* of the duplexer 812*d*. The duplexer 812*d* can be configured to direct the downlink signals received at the downlink port 816*d* to be output at the common port 814*d*. As mentioned above, the common port 814*d* can be communicatively coupled to the common amplification path 819 such that the duplexer 812*d* can direct the downlink signals toward the common amplification path 819. Therefore, the combined duplexer 840 and the duplexer 812*d* can be configured to direct the downlink signals from the second interface port 811 toward the common amplification path 819.

The common amplification path 819 can include one or more common amplifier chains, such as a common amplifier chain 820. The common amplifier chain 820 can include one or more common amplifiers configured to apply a gain to signals received by the common amplifier chain 820. In the illustrated embodiment, the common amplifier chain 820 can be communicatively coupled to the common port 814*d* of the duplexer 812*d*. Therefore, the common amplifier chain 820 can be configured to receive both uplink and downlink signals such that the common amplifier chain 820 can apply a gain to both the downlink signals and the uplink signals that can be output by the duplexer 812*d*. As mentioned above, the gain can be a set gain or a variable gain and can be less than, equal to, or greater than one. In some embodiments the gain of the common amplifier chain 820 can be adjusted by a control unit 822 communicatively coupled to the common amplifier chain 820. In some embodiments the control unit 822 can adjust the gain of the common amplifier chain 820 based on wireless communication conditions.

If included in the signal booster 802, the control unit 822 can be implemented by any suitable mechanism, such as a program, software, function, library, software as a service, analog or digital circuitry, or any combination thereof. The control unit 822 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the common amplifier chain 820. For example, the adjustments can be based on radio frequency (RF) signal inputs.

The common amplifier chain 820 can be communicatively coupled to the common port 814*c* of the combined duplexer 840 such that the common port 814*c* can receive both the uplink signals and the downlink signals output by the common amplifier chain 820. The combined duplexer 840 can be configured to direct the downlink signals from the common port 814*c* toward the downlink port 816*c* and direct the uplink signals from the common port 814*c* toward the uplink port 818*c*. The downlink port 816*c* of the combined duplexer 840 can be communicatively coupled to the downlink port 816*a* of the combined duplexer 840 such that the combined duplexer 840 can be configured to direct the downlink signals toward the downlink port 816*a* of the combined duplexer 840. Similarly, the uplink port 818*c* of the combined duplexer 840 can be communicatively coupled to the uplink port 818*b* of the combined duplexer 840 such that the combined duplexer 840 can be configured to direct the uplink signals toward the uplink port 818*b* of the combined duplexer 840.

The combined duplexer 840 can direct the downlink signals from the downlink port 816*a* toward the common port 814*a* such that the downlink signals can be communicated from the common port 814*a* toward the first antenna 808 via the first interface port 809. The combined duplexer 840 can direct the uplink signals from the uplink port 818*b* toward the common port 814*b* such that the uplink signals can be communicated from the common port 814*b* toward the second antenna 810 via the second interface port 811.

Therefore, the duplexer 812*d* and the combined duplexer 840 of the signal booster 802 can be configured to direct uplink signals received at the first interface port 809 toward the common amplification path 819 and from the common amplification path 819 toward the second interface port 811. Additionally, the duplexer 812*d* and the combined duplexer 840 can be configured to direct downlink signals received at the second interface port 811 toward the common amplification path 819 and from the common amplification path 819 toward the first interface port 809.

Therefore, the signal booster 802 with the combined duplexer 840 can be configured such that both downlink signals and uplink signals can pass through and be amplified by one or more common amplifier chains 820 of the common amplification path 819. The use of the common amplifier chains 820 with the combined duplexer 840 can reduce the number of components within the signal booster 802, decrease insertion loss, and decrease the noise floor relative to the signal booster 702.

For example in FIG. 7, a downlink signal output by the amplifier chain 720 will be routed to the server antenna 708 via a first duplexer 712*c* and a second duplexer 712*a*. An uplink signal output by the amplifier chain 720 will be routed to the donor antenna 710 via a first duplexer 712*c* and a second duplexer 712*b*. Each duplexer has a selected amount of insertion loss. A typical duplexer can have about 3 decibels (dB) of insertion loss. Accordingly, a signal output from the amplifier chain 720 having a power of 30 dB with reference to one milliwatt (dBm), will be reduced to approximately 24 dBm due to the insertion loss of the two duplexers.

In FIG. 8*d*, a downlink signal output by the amplifier chain 820 will be routed to the server antenna 808 through the combined duplexer 840 via common port 814*a*. Similarly, an uplink signal output by the amplifier chain 820 will be routed to the donor antenna 810 through the combined duplexer 840 via common port 814*b*. The single combined duplexer will have substantially less insertion loss than the two duplexers will in the example of FIG. 7. For example, the combined duplexer may have an insertion loss of approximately 3 dB. Accordingly, a 30 dBm signal output by the amplifier chain 820 will only be reduced to 27 dBm due to the insertion loss of the combined duplexer 840.

In some embodiments, the common amplification path 819 can include additional amplifier chains than that expressly depicted and/or can include one or more filtering schemes configured to filter the uplink and/or downlink signals. The filtering can be performed to reduce noise in the uplink and downlink signals and/or to provide improved isolation between the uplink and downlink signals. As previously discussed, FIG. 3 depicts an example embodiment of a signal booster with a common amplification path configured to filter the downlink and uplink signals. The common amplification path 319, including the splitting duplexer 330 and combining duplexer 340, can be used in place of 819 in the signal booster 802. A separate gain block for the UL signal or DL signal can be applied between the splitting duplexer 330 and combining duplexer 340, as previously discussed.

Further, the common amplification path 819 can include other components than those expressly depicted, such as one or more attenuators (variable and/or set) that can be configured to attenuate the downlink and/or uplink signals by applying a gain of less than one to the uplink and downlink signals. In some embodiments, the additional components can be included between the components expressly depicted in the figures. As such, the use of the terms "from," "to," and "toward" with respect to signals propagating between specific components can include embodiments where intermediate components can be included between the specific components. Further, in these and other embodiments, the common amplification path 819 can include a common signal detector (e.g., a radio frequency (RF) sensor) configured to receive both the uplink and downlink signals and configured such that it can detect a power level of both the uplink and downlink signals.

The use of a combined duplexer and a common amplification path does not limit the ability to separately control the amplification, filtering, and attenuation of a first direction signal or a second direction signal.

Additionally, although the embodiment of FIG. 8*d* is described with respect to a signal booster, the above described configuration of directing opposite direction signals (e.g., uplink and downlink signals) to and from a common amplification path can be used with respect to any suitable bi-directional amplifier. Accordingly, the scope of the present disclosure is not limited to signal boosters.

Figure 9:
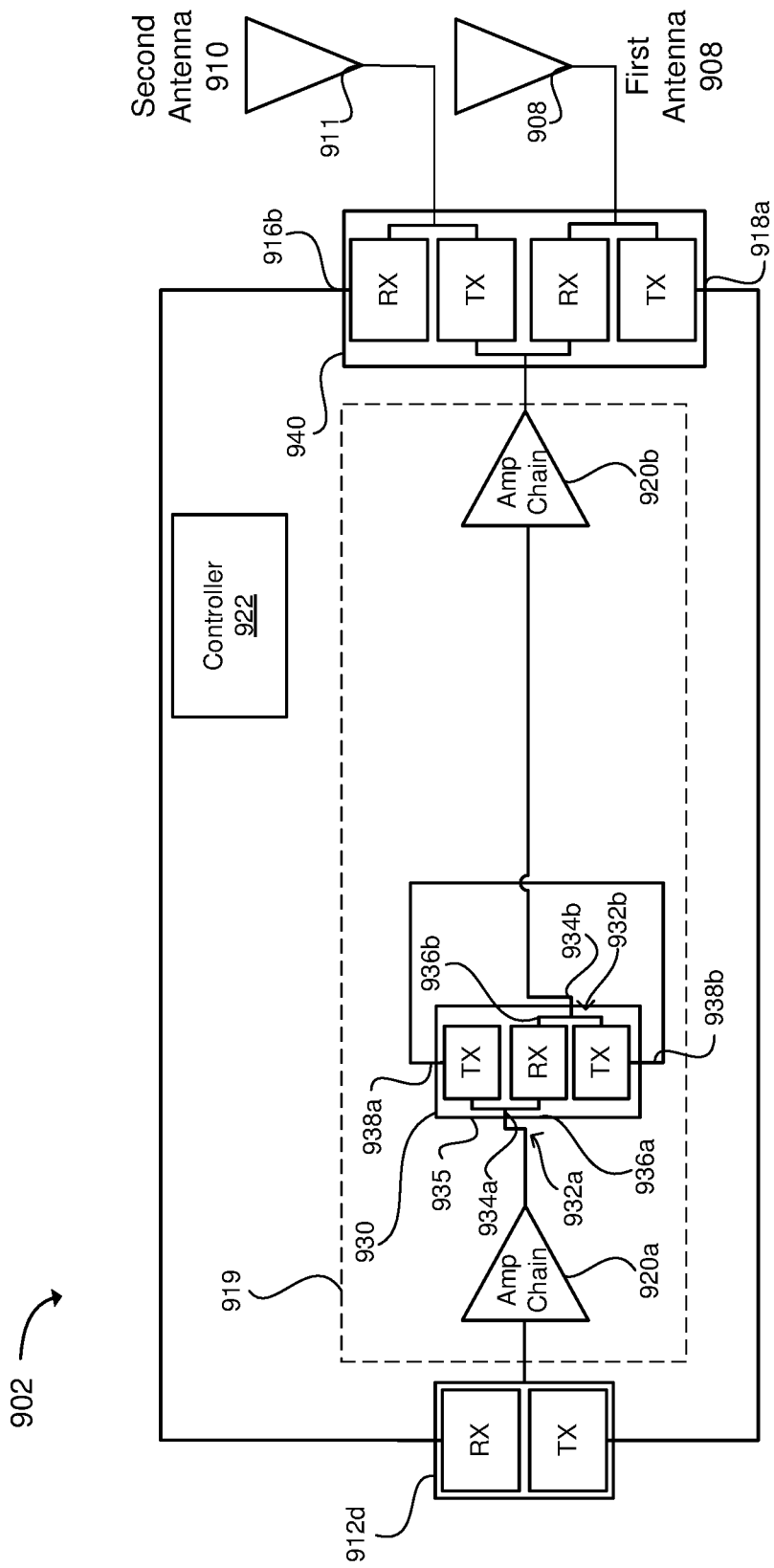
FIG. 9 illustrates an embodiment of a bi-directional signal booster with a common amplification path and multiple combined duplexers in accordance with an example.

FIG. 9 illustrates an example embodiment of a bi-directional signal booster 902 (referred to hereinafter as "the signal booster 902") with a common amplification path 919, arranged in accordance with at least some embodiments described herein. In some embodiments, the signal booster 902 can be configured to operate in a manner analogous to the operation of the signal booster 102 of the system 100 of FIG. 1. The signal booster 902 can include a first interface port 909 communicatively coupled to a first antenna 908, a second interface port 911 communicatively coupled to a second antenna 910, with the common amplification path 919 communicatively coupled between the first interface port 909 and the second interface port 911. In one example, the first antenna 908 can be a server antenna and the second antenna 910 can be a donor antenna.

Similar to the signal booster 802 of 8, the signal booster 302 can be configured such that uplink signals received at the first interface port 909 from the first antenna 908 can be directed toward the common amplification path 919. The signal booster 902 can be configured such that downlink signals received at the second interface port 911 from the second antenna 910 can also be directed toward the common amplification path 919. The common amplification path 919 can accordingly be configured to amplify both the uplink and downlink signals.

The signal booster 902 can additionally be configured to direct the uplink signals from the common amplification path 919 toward the second interface port 911 and the second antenna 910. The signal booster 902 can also be configured to direct the downlink signals from the common amplification path 919 toward the first interface port 909 and the first antenna 908. In the illustrated embodiment of FIG. 9, the signal booster 902 can include duplexer 912*d* and combined duplexer 940 configured in a manner analogous to that of the duplexer 812*d* and combined duplexer 840 of the signal booster 802 of 8. The duplexer 912*d* and combined duplexer 940 can accordingly be configured to direct the uplink and downlink signals in a manner analogous to how the duplexer 812*d* and combined duplexer 840 direct uplink and downlink signals in the signal booster 802 of 8.

In the illustrated embodiment, the common amplification path 919 can include a common amplifier chain 920*a* and a common amplifier chain 920*b*. The common amplifier chains 920*a* and 920*b* can each be configured to apply a gain to the uplink and downlink signals that can propagate through the common amplification path 919, similar to the common amplifier chain 820 of FIG. 8. In some embodiments, the common amplifier chain 920*a* and/or the common amplifier chain 920*b* can be configured to apply the gain based on instructions received from a control unit 922 of the signal booster 902 that can be analogous to the control unit 822 of the signal booster 802 of FIG. 8.

In some embodiments, the common amplification path 919 can include a splitter/combiner combined duplexer 930 that can be configured to filter the uplink and downlink signals that can propagate through the common amplification path 919. As described in further detail below, the splitter/combiner combined duplexer 930 can be configured to separate (i.e., split) the uplink signals within the common amplification path 919 from the downlink signals within the common amplification path using a first duplexer 932*a*. Additionally, as described in further detail below, the splitter/combiner combined duplexer 935 can be configured to recombine the uplink and downlink signals after they have been separated by the first duplexer 932a using a second duplexer 932b in the splitter/combiner combined duplexer 935. Accordingly, the splitter/combiner combined duplexer 935 can operate equivalent to the two separate duplexers 330 and 340 illustrated in FIG. 3. While each of the duplexers 330 and 340 include both a Tx filter and an Rx filter, for a total of four filters, the splitter/combiner combined duplexer 935 can operate using only three filters. In this example, the splitter/combiner combined duplexer 935 includes a first Tx filter, a first Rx filter, and a second Tx filter. The three filters can be used to form a splitting duplexer 932a and a combining duplexer 932b within a single package of the splitter/combiner combined duplexer 935.

In the illustrated embodiment of FIG. 9, the splitting duplexer 932a can include a common port 934a communicatively coupled to an output of the common amplifier chain 920a such that the common port 934a can receive the uplink and downlink signals that have been amplified by the common amplifier chain 920a. In some embodiments, the splitting duplexer 932a can be configured to filter uplink signals received at the common port 934a based on an uplink frequency range associated with the uplink signals such that the uplink signals and their associated uplink frequencies can pass through the filtering and can be output at a first uplink port 938a of the splitting duplexer 932a. Additionally, frequencies outside of the uplink frequency range (e.g., noise, downlink frequencies, etc.) can be filtered out and are not output at the first uplink port 938a. The splitting duplexer 932a can also be configured to filter downlink signals received at the common port 934a based on a downlink frequency range associated with the downlink signals such that the downlink signals and their associated downlink frequencies can pass through the filtering and can be output at a first downlink port 936a of the splitting duplexer 932a. Additionally, frequencies outside of the downlink frequency range (e.g., noise, uplink frequencies, etc.) can be filtered out and are not output at the first downlink port 936a.

The first downlink port 936a of the splitting duplexer 932a can be communicatively coupled to a second downlink port 936b of the combining duplexer 932b and the first uplink port 938a of the splitting duplexer 932a can be communicatively coupled to a second uplink port 938b of the combining duplexer 932b. In some embodiments, the combining duplexer 932b can be configured to filter the uplink signals received at the second uplink port 938b based on the frequency range associated with the uplink signals in a manner similar to the splitting duplexer 932a. In some embodiments, the combining duplexer 932b can also be configured to filter the downlink signals received at the second downlink port 936b based on the frequency range associated with the downlink signals in a manner similar to the splitting duplexer 932a. The combining duplexer 932b can also be configured to output the filtered uplink and downlink signals at the common port 934b of the combining duplexer 932b. In the illustrated embodiment, the common port 934b of the combining duplexer 932b can be communicatively coupled to the common amplifier chain 920b such that the common amplifier chain 920b can receive both the uplink and downlink signals output at the common port 932b and can apply a gain to both the uplink and downlink signals.

In some embodiments, the common amplification path 919 can include a downlink gain block (not expressly depicted in FIG. 9) communicatively coupled between the first and second downlink ports 936a, 936b of the duplexers 932a and 932b, respectively, in the splitter/combiner combined duplexer 935. The downlink gain block can accordingly be configured to receive and apply and/or adjust a gain to the downlink signals but not the uplink signals. In some embodiments, the downlink gain block can be configured to apply and/or adjust the gain in response to instructions received from the control unit 922. The downlink gain block can be any suitable system, apparatus, or device configured to apply a gain to the downlink signals received by the downlink gain block. For example, the downlink gain block can include an amplifier chain and/or one or more attenuators. The amplifier chain can include one or more fixed amplifiers or variable amplifiers. The attenuator can include one or more fixed or variable attenuators.

In these or other embodiments, the common amplification path 919 can include an uplink gain block (not expressly depicted in FIG. 9) communicatively coupled between the first and second uplink ports 938a, 938b of the duplexers 932a and 932b. The uplink gain block can be configured to receive and apply and/or adjust a gain to the uplink signals but not the downlink signals. In some embodiments, the uplink gain block can be configured to apply the gain in response to instructions received from the control unit 922. The uplink gain block can be any suitable system, apparatus, or device configured to apply a gain to the uplink signals received by the uplink gain block. For example, the uplink gain block can include an amplifier chain and/or one or more attenuators. The amplifier chain can include one or more fixed amplifiers or variable amplifiers. The attenuator can include one or more fixed or variable attenuators.

Therefore, the common amplification path 919 can also be configured to filter the uplink and downlink signals that can propagate through the common amplification path 919. The filtering can improve signal quality, increase isolation between the uplink and downlink signals, and/or allow for greater amplification of the downlink and/or uplink signals. Additionally, through the placement of one or more uplink gain blocks and/or one or more downlink gain blocks, the common amplification path 919 can be configured to apply different gains to the uplink and downlink signals.

Modifications, additions, or omissions can be made to the signal booster 902 without departing from the scope of the present disclosure. For example, the location of the splitter/combiner combined duplexer 935 within the common amplification path 919 with respect to the common amplifier chains 920a and 920b, as well as with respect to other amplifier chains not expressly depicted, can vary without departing from the scope of the present disclosure.

Also, in some embodiments, the splitter/combiner combined duplexer 935 can be replaced with a signal splitter/combiner that may not perform any filtering as described, but can instead split or combine the uplink and downlink signals in the manner described. For example, in some embodiments, the splitting duplexer 932a can be replaced with a signal splitter that may not perform any filtering and that can direct both downlink and uplink signals toward the second uplink port 938b and the second downlink port 936b of the combining duplexer 932b. The combining duplexer can accordingly filter out the downlink signals received at the second uplink port 938b and filter out the uplink signals received at the second downlink port 936b, such that filtered downlink and uplink signals are output at the common port 934b. In other embodiments, the combining duplexer 932b can be replaced with a signal splitter/combiner configured to receive the uplink and downlink signals from the splitting duplexer 932a and can output the uplink and downlink signals at the common port 932a without providing additional filtering.

Further, as mentioned above, in some embodiments, one or more the duplexers or combined duplexers of FIG. 9 can be replaced with a set of filters (e.g., band pass filters), where for each replaced duplexer one of the filters can be configured based on uplink signal frequencies in the other filter can be configured based on downlink signal frequencies.

Moreover, one or more amplifier chains can be included between the combined duplexer 940 and 912d TX and/or the duplexers 940 and 912d RX such that the uplink and/or downlink signals can be individually amplified before reaching the common amplification path 919. Further, in these or other embodiments, one or more amplifier chains can be included between the output of 912d and 918a and/or between the output of 912d and 916b such that the downlink and uplink signals can be individually amplified after leaving the common application path 919 but before being transmitted by the second antenna 910 and the first antenna 908, respectively. Therefore, the signal booster 902 can be configured such that the gain of the uplink and downlink signals can be adjusted individually.

Further, in some embodiments, the signal booster 902 can include more than one common amplification path where each common amplification path can be configured to apply a gain to uplink and downlink signals associated with a particular wireless communication band, such as a band of the 700 MHz band plan. Also, in some embodiments, the common amplification path 919 can include additional amplifier chains than those expressly depicted.

Figure 10:
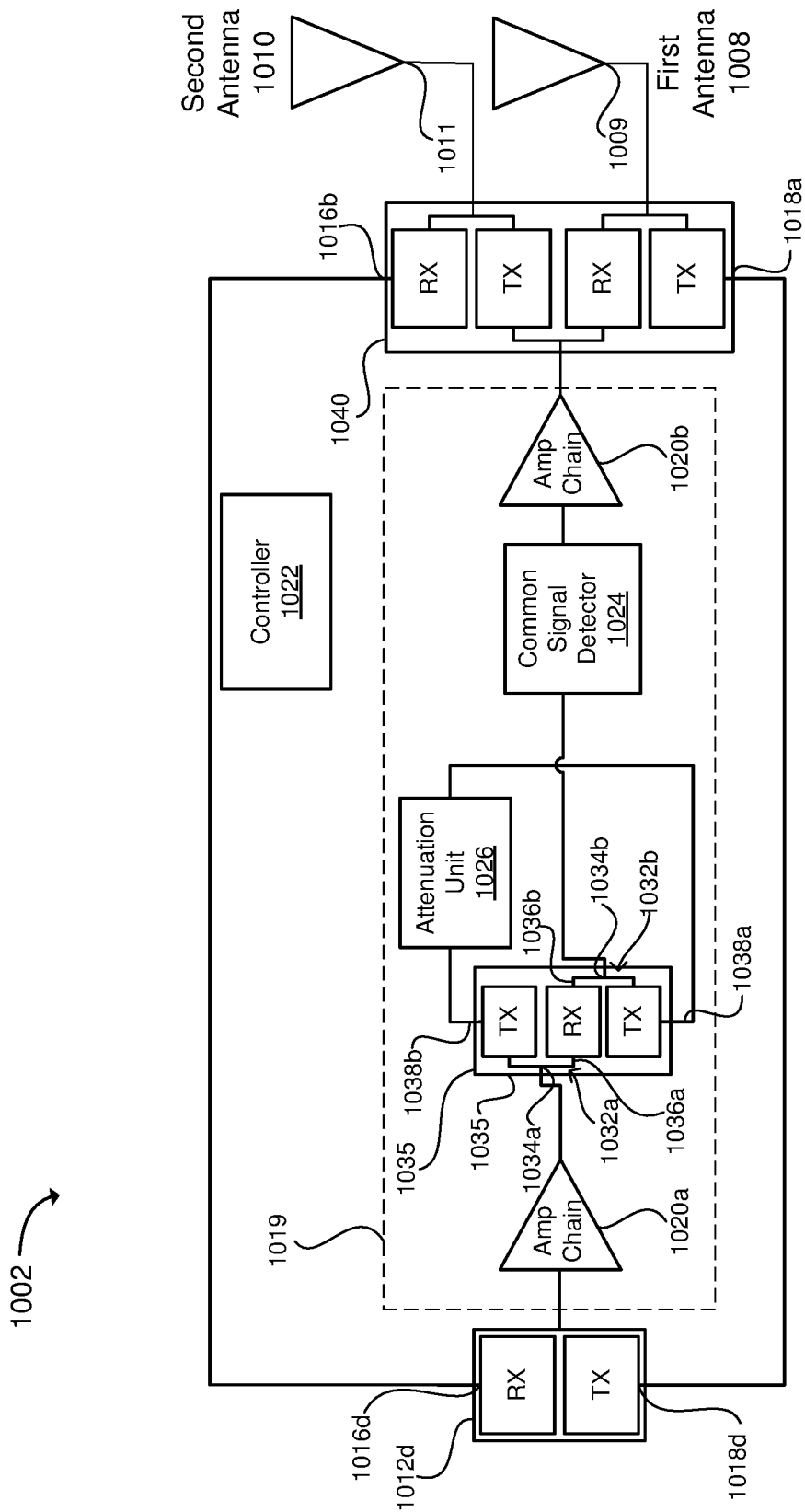
FIG. 10 illustrates an embodiment of a bi-directional signal booster with a common amplification path, multiple combined duplexers, and a common signal detector in accordance with an example.

FIG. 10 illustrates an example embodiment of a bi-directional signal booster 1002 (referred to hereinafter as "the signal booster 1002") with a common amplification path 1019, arranged in accordance with the least some embodiments described herein. In some embodiments, the signal booster 1002 can be configured to operate in a manner analogous to the operation of a signal booster 102 of the system 100 of FIG. 1. Similar to the signal booster 802 of FIG. 8, the signal booster 1002 can include a first interface port 1009 communicatively coupled to a first antenna 1008, a second interface port 1011 communicatively coupled to a second antenna 1010, with the common amplification path 1019 communicatively coupled between the first interface port 1009 and the second interface port 1011. In one example, the second antenna 1010 can be a donor antenna and the first antenna can be a server antenna.

Analogous to the signal booster 802 of FIG. 8, the signal booster 1002 can be configured such that uplink signals received at the first interface port 1009 from the first antenna 1008 can be directed toward the common amplification path 1019. The signal booster 1002 can additionally be configured such that downlink signals received at the second interface port 1011 from the second antenna 1010 can also be directed toward the common amplification path 1019. The common amplification path 1019 can accordingly be configured to receive and amplify both the uplink and downlink signals.

The signal booster 1002 can be configured to direct the uplink signals from the common amplification path 1019 toward the second interface port 1011 and the second antenna 1010. The signal booster 1002 can also be configured to direct the downlink signals from the common amplification path 1019 toward the first interface port 1009 and the first antenna 1008. In the illustrated embodiment of FIG. 10, the signal booster 1002 can include duplexer 1012d and combined duplexer 1040 configured in a manner analogous to that of the duplexer 812d and combined duplexer 840 of the signal booster 802 of FIG. 8. The duplexer 1012d and combined duplexer 1040 can accordingly be configured to direct the uplink and downlink signals in a manner analogous to how the duplexer 812d and combined duplexer 840 direct uplink and downlink signals in the signal booster 802 of FIG. 8.

In the illustrated embodiment of FIG. 10, the common amplification path 1019 can include a common amplifier chain 1020a and a common amplifier chain 1020b that can be analogous to the common amplifier chains 920a and 920b, respectively, of FIG. 9. Therefore, the common amplifier chains 1020a and 1020b can be configured to amplify and filter the uplink and downlink signals that can propagate through the common amplification path 1019 in a manner analogous to that of the common amplifier chains 920a and 920b of the common amplification path 919 of FIG. 9. In some embodiments, the common amplifier chains 1020a and 1020b can be configured to amplify the uplink and downlink signals based on instructions received from a control unit 1022 of the signal booster 1002 that can be analogous to the control unit 822 of the signal booster 802 of FIG. 8. Additionally, the common amplification path 1019 can include a splitter/combiner combined duplexer 1035 that can be analogous to the splitter/combiner combined duplexer 935 of the common amplification path 919 of FIG. 9.

In some embodiments, the common amplification path 1019 can include a common signal detector 1024 configured to receive both the uplink and downlink signals that can propagate through the common amplification path 1019. The common signal detector 1024 can be any suitable system, apparatus, or device configured to detect a power level of signals that it can receive. For example, in some embodiments, the common signal detector 1024 can be an RF sensor that can include a signal rectifier (e.g., a diode) and a resistor that can have a variable output voltage based on the power of received signals. As such, the common signal detector 1024 can be configured to detect power levels of both the uplink and downlink signals that can propagate through the common amplification path 1019. In traditional embodiments, a signal booster can include an uplink signal detector configured to detect the power level of uplink signals and a downlink signal detector configured to detect the power level of downlink signals, but not a signal detector configured to detect the power level of both downlink and uplink signals. Therefore, including the common signal detector 1024 in the common amplification path 1019 can reduce the number of components that can be used in the signal booster 1002.

In some embodiments, the common signal detector 1024 can be communicatively coupled to the control unit 1022 such that the control unit 1022 can determine the power levels of the uplink and downlink signals that can be detected by the common signal detector 1024. In the illustrated embodiment, the control unit 1022 can be configured to differentiate between the uplink and downlink signals using an attenuation unit 1026 that can also be communicatively coupled to the control unit 1022 and communicatively coupled between an uplink port 1038a of a splitting duplexer 1032a and an uplink port 1038b of a combining duplexer 1032b located in the splitter/combiner combined duplexer 1035, which is analogous to the splitter/combiner combined duplexer 935 in FIG. 9.

In the illustrated embodiment of FIG. 10, the signal booster 1002 can be configured for instances when the uplink signals received by the signal booster 1002 can have a power level that is substantially larger than the power level of the downlink signals received by the signal booster 1002 (e.g., when the signal booster 1002 is significantly closer to a wireless device than a wireless communication access point). Therefore, to determine a power level of the downlink signals, the control unit 1022 can direct the attenuation unit 1026 to attenuate the uplink signals that can pass through the attenuation unit 1026 such that the downlink signals received by the common signal detector 1024 can be substantially stronger than the uplink signals received by the common signal detector 1024. As such, the control unit 1022 can determine that the power detected by the common signal detector 1024 can be associated with the downlink signals when the uplink signal is being attenuated by the attenuating unit 1026.

To determine a power level of the uplink signals, the control unit 1022 can direct the attenuation unit 1026 to cease or substantially reduce the attenuation of the uplink signals. In the illustrated embodiment, because the received uplink signals can be much stronger than the downlink signals, the downlink power levels that can be included in the power detected by the common signal detector 1024 can be substantially negligible compared to the uplink power levels when the attenuation of the uplink signals is ceased or substantially reduced. Therefore, the control unit 1022 can be configured to determine that the power levels detected by the signal detector 1024 can be substantially associated with the uplink signals when the attenuation of the uplink signals is ceased or substantially reduced.

The attenuation unit 1026 can be any suitable system, apparatus, or device that can be configured to attenuate the uplink signals (or downlink signals) that can be received by the common signal detector 1024. For example, in some embodiments the attenuation unit 1026 can be a variable attenuator that can attenuate uplink signals (or downlink signals) that can pass through the attenuation unit 1026 in response to instructions received from the control unit 1022. In some embodiments, the attenuation unit 1026 can be a switch that can be opened and closed in response to instructions received from the control unit 1022. Therefore, when the switch is opened, the uplink signals (or downlink signals) cannot pass to the combining duplexer 1032*b* such that uplink signals cannot be received by the common signal detector 1024 and can accordingly be attenuated to a power level of substantially zero at the common signal detector 1024. Additionally, in other embodiments, the attenuation unit 1026 can be an amplifier chain configured to apply a gain of less than one to the uplink signals when instructed to attenuate the uplink signals.

Therefore, the signal booster 1002 can be configured such that uplink and downlink signals can pass through the same amplification path (e.g., the common amplification path 419), and also such that the uplink and downlink signals can be detected using the same signal detector (e.g., the common signal detector 1024). Further, the signal booster 1002 can be configured such that the uplink and downlink signals can be filtered in the common amplification path 1019.

Modifications, additions, or omissions can be made to the signal booster 1002 without departing from the scope of the present disclosure. For example, in embodiments where the downlink signals received by the signal booster 1002 can be much stronger than the uplink signals received by the signal booster 1002, the attenuation unit 1026 can be communicatively coupled between a downlink port 1036*a* of the splitting duplexer 1032*a* and a downlink port 1036*b* of the combining duplexer 1032*b* instead of between the uplink port 1038*a* of the splitting duplexer 1032*a* and the uplink port 1038*b* of the combining duplexer 1032*b*. Moreover, in these and other embodiments, the control unit 422 can be configured to direct the attenuation of the downlink signals instead of the uplink signals.

Further, in some embodiments an uplink attenuation unit can be communicatively coupled between the uplink port 1018*d* of duplexer 1012*d* and the uplink port 1018*a* of the combined duplexer 1040 in addition to or instead of having the attenuation unit 426 communicatively coupled between the uplink ports 1038*a* and 1038*b* of the splitting duplexer 1032*b* and the combining duplexer 1032*a*, respectively, of the splitter/combiner combined duplexer 1035. In applicable embodiments, a downlink attenuation unit can be communicatively coupled between the downlink port 1016*d* of duplexer 1012*d* and the downlink port 1016*b* of the combined duplexer 1035.

Additionally, in some embodiments, the common amplification path 1019 can include a downlink gain block communicatively coupled between the downlink ports 1036*a* and 1036*b* of the duplexers 1032*a* and 1032*b*, respectively, of the splitter/combiner combined duplexer 1035. The downlink gain block can accordingly be configured to receive and apply and/or adjust a gain to the downlink signals but not the uplink signals. In some embodiments, the downlink gain block can be configured to apply and/or adjust the gain in response to instructions received from the control unit 1022. The downlink gain block can be any suitable system, apparatus, or device configured to apply a gain to the downlink signals received by the downlink gain block. For example, the downlink gain block can include an amplifier chain and/or an attenuator.

In these or other embodiments, the common amplification path 1019 can include an uplink gain block communicatively coupled between the uplink ports 1036*a* and 1036*b* of the duplexers 1032*a* and 1032*b*, respectively, of the splitter/combiner combined duplexer 1035. The uplink gain block can be configured to receive and apply and/or adjust a gain to the uplink signals but not the downlink signals. In some embodiments, the uplink gain block can be configured to apply the gain in response to instructions received from the control unit 1022. The uplink gain block can be any suitable system, apparatus, or device configured to apply a gain to the uplink signals received by the uplink gain block. For example, the uplink gain block can include an amplifier chain and/or an attenuator.

Additionally, in some embodiments, an uplink attenuation unit can be communicatively coupled between the uplink ports of the splitting and combining duplexers and a downlink attenuation unit can also be communicatively coupled between the downlink ports of the splitting and combining duplexers. In these embodiments, the control unit 1022 can direct the uplink attenuating unit to attenuate the uplink signals to measure the power of the downlink signals and vice versa. Additionally, the location of the common signal detector 1024 with respect to other components of the common amplification path 1019 can vary depending on particular embodiments.

Further, in some embodiments, the common signal detector 1024 and the attenuation unit 1026 can be communicatively coupled between the duplexer port 1018*d* of duplexer 1012*d*, and the duplexer port 1018*a* of the combined duplexer 1040, and the first interface port 1009 instead of being included in the common amplification path 1019. In other embodiments, the common signal detector 1024 and the attenuation unit 1026 can be communicatively coupled between the duplexer port 1016*d* of duplexer 1012*d* and the second interface port 1011 instead of being included in the common amplification path 1019.

Figure 11:
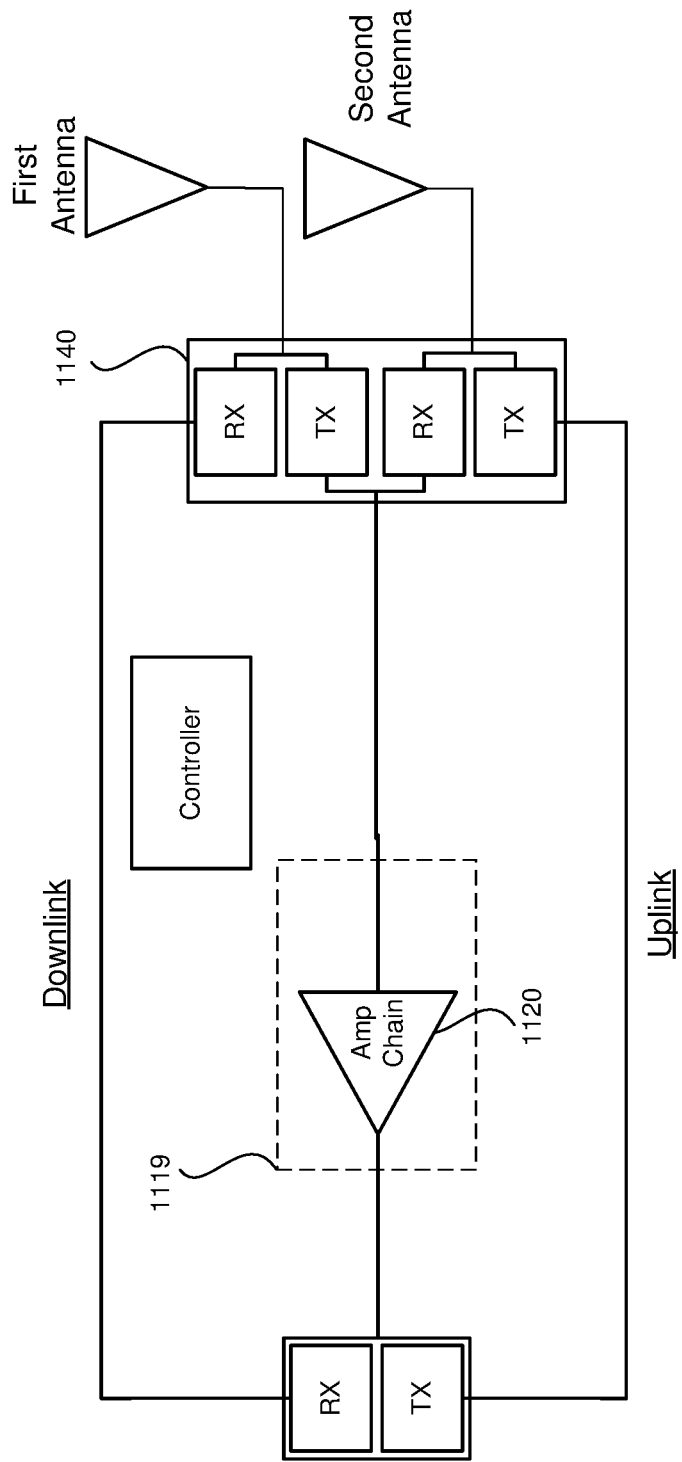
FIG. 11 illustrates an example embodiment of a bi-directional signal booster with a common amplification path using a combined duplexer used for reducing a noise floor in accordance with an example.

The embodiment of FIG. 11 provides an illustration of a combined duplexer 1140 with a common amplification path 1019. In this example, the amplifier chain 1120 can be a low noise amplifier used to boost the signal prior to filtering and amplification with a power amplifier (PA). The use of the combined duplexer 1140 prior to the LNA can reduce the noise floor in a similar manner to the reduction of the insertion loss using the combined duplexer 830 after the PA.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module may not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A combined duplexer, comprising:
a first common port;
a second common port;
a first first direction filter configured to pass a first frequency band;
a first second direction filter configured to pass a second frequency band;
a second first direction filter configured to pass the first frequency band;
wherein the first first direction filter and first second direction filter share the first common port; and
wherein the first second direction filter and the second first direction filter share the second common port that is separate from the first common port.

2. The combined duplexer of claim 1, further comprising:
an amplifier communicatively coupled to the second common port to form a repeater;
wherein the first common port is configured to be communicatively coupled to a donor antenna or a server antenna.

3. The combing duplexer of claim 2, wherein the amplifier is one or more of a low noise amplifier (LNA), a power amplifier (PA), a gain block, or an amplifier chain.

4. The combined duplexer of claim 1, further comprising:
a common signal detector communicatively coupled to the between the first common port and the second common port;
wherein, the common signal detector is configured to receive both the first frequency band and a second frequency band, and is configured to detect one or more of a first power level of the first band, a second power level of the second frequency band, or a combined power level of the first frequency band and the second frequency band.

5. The combined duplexer of claim 4, further comprising:
one or more attenuation units communicatively coupled to the common signal detector and configured to substantially attenuate the first frequency band to enable the second frequency band to be detected by the common signal detector, wherein the one or more attenuation units include one or more of a fixed attenuator, a variable attenuator, or a switch.

6. The combined duplexer of claim 1, wherein the first frequency band is for an uplink signal, and the second frequency band is for a downlink signal; or the first frequency band is for a downlink signal and the second frequency band is for an uplink signal.

7. The combined duplexer of claim 1, further comprising:
a third common port; and
a second second direction filter configured to pass the second frequency band,
wherein the second first direction filter and the second second direction filter share the third common port.

8. The combined duplexer of claim 1, further comprising:
N+1 additional first direction filters and second direction filters, where N is a positive whole number, to form N additional common ports,
wherein each of the N additional common ports is communicatively coupled to one first direction filter and one second direction filter, and
wherein N−1 of a total number of first direction filters and second direction filters in the combined duplexer are communicatively coupled to two separate common ports.

9. The combined duplexer of claim 1, further comprising a common amplification path communicatively coupled between the first common port and the second common port such that the common amplification path receives both a first direction signal in the first frequency band and a second direction signal in the second frequency band, wherein the common amplification path includes one or more of a common signal detector or a common amplifier.

10. The combined duplexer of claim 9, wherein the common amplifier is configured to receive and amplify both a first direction signal in the first frequency band and a second direction signal in the second frequency band.

11. A combined duplexer, comprising:
a first common port;
a second common port;
a first first direction filter configured to pass a first frequency band;
a first second direction filter configured to pass a second frequency band;
a second second direction filter configured to pass the second frequency band;
wherein the first first direction filter and first second direction filter are communicatively coupled to the first common port; and
wherein the first first direction filter and second second direction filter are communicatively coupled to the second common port that is separate from the first common port.

12. The combined duplexer of claim 11, further comprising:
an amplifier communicatively coupled to the second common port to form a repeater;
wherein the first common port is configured to be communicatively coupled to a donor antenna or a server antenna.

13. The combined duplexer of claim 12, wherein the amplifier is one or more of a low noise amplifier (LNA), a power amplifier (PA), a gain block, or an amplifier chain.

14. The combined duplexer of claim 11, wherein the first frequency band is for an uplink signal, and the second frequency band is for a downlink signal; or the first frequency band is for a downlink signal and the second frequency band is for an uplink signal.

15. A combined duplexer, comprising at least:
a first common port;
a second common port;
a third common port;
a first first direction filter configured to pass a first frequency band;
a first second direction filter configured to pass a second frequency band;
a second first direction filter configured to pass the first frequency band;
a second second direction filter configured to pass the second frequency band;
wherein the first first direction filter and first second direction filter are communicatively coupled to the first common port;
wherein the first second direction filter and second first direction filter are communicatively coupled to the second common port that is separate from the first common port; and wherein the second first direction filter and second second direction filter are communicatively coupled to the third common port that is separate from the first common port and the second common port.

16. The combined duplexer of claim 15, further comprising:
a duplexer having a first direction port, a second direction port, and a common port, with the first direction port communicatively coupled to the first first direction filter and the second direction port communicatively coupled to the second second direction filter;
an amplifier communicatively coupled between the common port of the duplexer and the second common port to form a repeater;
wherein the first common port is configured to be communicatively coupled to a first antenna;
wherein the third common port is configured to be communicatively coupled to a second antenna.

17. The repeater of claim 16, wherein the amplifier is one or more of a low noise amplifier (LNA), a power amplifier (PA), a gain block, or an amplifier chain.

18. The repeater of claim 16, further comprising a second combined duplexer having a first common port and a second common port, the second combined duplexer communicatively coupled between the duplexer and the combined duplexer, wherein the second combined duplexer is configured to enable one or more of a first direction signal in the first frequency band or a second direction signal in the second frequency band to be amplified or attenuated independently.

19. The combined duplexer of claim 16, further comprising:
a common signal detector communicatively coupled between the second common port and an output of the amplifier;
wherein, the common signal detector is configured to receive both the first frequency band and a second frequency band, and is configured to detect one or more of a first power level of a first direction signal in the first band, a second power level of a second direction signal in the second frequency band, or a combined power level of the first direction signal and the second direction signal.

20. The combined duplexer of claim 19, further comprising:
one or more attenuation units communicatively coupled to the common signal detector and configured to substantially attenuate the first frequency band to enable the second frequency band to be detected by the common signal detector, wherein the one or more attenuation units include one or more of a fixed attenuator, a variable attenuator, or a switch.

21. A repeater having a combined duplexer, comprising:
a combined duplexer configured to be communicatively coupled to a server antenna and a donor antenna, the combined duplexer comprising a first direction filter, a second direction filter, and one or more of an additional first direction filter or a second direction filter;
a duplexer, a diplexer, or a power combiner communicatively coupled to the combined duplexer;
an amplifier communicatively coupled between the combined duplexer and the duplexer, the diplexer, or the power combiner; and a common signal detector communicatively coupled to the between the first common port and the second common port;
wherein, the common signal detector is configured to receive both a first direction signal in the first frequency band and a second direction signal in the second frequency band, and is configured to detect one or more of a first power level of the first direction signal in the first frequency band, a second power level of the second direction signal in the second frequency band, or a combined power of the first direction signal and the second direction signal.

22. The repeater of claim 21, wherein the amplifier is one or more of a low noise amplifier (LNA), a power amplifier (PA), a gain block, or an amplifier chain.

23. The repeater of claim 21, further comprising:
one or more attenuation units communicatively coupled to the common signal detector and configured to substantially attenuate the first frequency band to enable the second frequency band to be detected by the common signal detector, wherein the one or more attenuation units include one or more of a fixed attenuator, a variable attenuator, or a switch.

24. The repeater of claim 21, wherein the attenuation unit comprises one or more of a variable attenuator, a switch, and an amplifier.

25. The repeater of claim 21, wherein the first frequency band is for an uplink signal, and the second frequency band is for a downlink signal; or the first frequency band is for the downlink signal and the second frequency band is for the uplink signal.

26. The repeater of claim 21, further comprising a second combined duplexer having a first common port and a second common port, the second combined duplexer communicatively coupled between the duplexer, the diplexer, or the power combiner and the combined duplexer, wherein the second combined duplexer is configured to enable one or more of a first direction signal in the first frequency band or a second direction signal in the second frequency band to be amplified or attenuated independently.

27. A repeater having a combined duplexer, comprising:
a combined duplexer configured to be communicatively coupled to a server antenna and a donor antenna, the combined duplexer comprising a first direction filter, a second direction filter, and one or more of an additional first direction filter or a second direction filter;
a duplexer, a diplexer, or a power combiner communicatively coupled to the combined duplexer;
an amplifier communicatively coupled between the combined duplexer and the duplexer, the diplexer, or the power combiner; and
a second combined duplexer having a first common port and a second common port, the second combined duplexer communicatively coupled between the duplexer, the diplexer, or the power combiner and the combined duplexer, wherein the second combined duplexer is configured to enable one or more of a first direction signal in the first frequency band or a second direction signal in the second frequency band to be amplified or attenuated independently.

* * * * *